(12) United States Patent
Choi et al.

(10) Patent No.: US 9,742,904 B2
(45) Date of Patent: Aug. 22, 2017

(54) MOBILE TERMINAL AND METHOD FOR CONTROLLING THE SAME

(71) Applicant: LG ELECTRONICS INC., Seoul (KR)

(72) Inventors: Jinhae Choi, Seoul (KR); Jonghoon Kim, Seoul (KR); Younghoon Lee, Seoul (KR); Jumin Chi, Seoul (KR)

(73) Assignee: LG LECTRONICS INC., Seoul (KR)

( * ) Notice: Subject to any disclaimer, the term of this patent is extended or adjusted under 35 U.S.C. 154(b) by 22 days.

(21) Appl. No.: 14/507,489

(22) Filed: Oct. 6, 2014

(65) Prior Publication Data
US 2015/0148106 A1    May 28, 2015

(30) Foreign Application Priority Data
Nov. 22, 2013 (KR) .................. 10-2013-0143208

(51) Int. Cl.
*H04M 1/725* (2006.01)
*H04M 1/02* (2006.01)
(Continued)

(52) U.S. Cl.
CPC ...... *H04M 1/72577* (2013.01); *G06F 3/0488* (2013.01); *G06F 21/36* (2013.01);
(Continued)

(58) Field of Classification Search
CPC .... G06F 3/0488; G06F 3/04883; G06F 21/36; H04M 1/0266; H04M 1/72577;
(Continued)

(56) References Cited

U.S. PATENT DOCUMENTS 8,487,918 B1 * 7/2013 Nelissen ................. G06F 3/038
345/204
2004/0203594 A1 * 10/2004 Kotzin ............... G06K 9/00154
455/411
(Continued)

FOREIGN PATENT DOCUMENTS

| CN | 102968242 A | 3/2013 |
| CN | 102981737 A | 3/2013 |
| WO | WO 2010/043277 A1 | 4/2010 |

OTHER PUBLICATIONS

Heo et al., "ForceTap: Extending the Input Vocabulary of Mobile Touch Screens by adding Tap Gestures", MobileHCI 2011, Stockholm, Sweden, Aug. 30-Sep. 2, 2011, XP055010529, pp. 113-122.

*Primary Examiner* — Kamran Afshar
*Assistant Examiner* — Farid Seyedvosoghi
(74) *Attorney, Agent, or Firm* — Birch, Stewart, Kolasch & Birch, LLP

(57) ABSTRACT

A mobile terminal including a terminal body; a wireless communication unit configured to perform wireless communication; a touchscreen display unit configured to switch between an inactivated state in which illumination is not applied to the touchscreen display unit and an activated state in which illumination is applied to the touch screen display unit; and a controller configured to receive a touch input on the touchscreen display unit when the touchscreen display unit is in the inactivated state, and execute a function corresponding to the received touch input and activate the touchscreen display unit.

17 Claims, 28 Drawing Sheets

(51) Int. Cl.
  *G06F 3/0488* (2013.01)
  *H04W 52/02* (2009.01)
  *G06F 21/36* (2013.01)
  *H04W 12/06* (2009.01)
  *H04W 88/02* (2009.01)

(52) U.S. Cl.
  CPC ......... *H04M 1/0266* (2013.01); *H04W 12/06* (2013.01); *H04W 52/027* (2013.01); *H04W 88/02* (2013.01); *Y02B 60/50* (2013.01)

(58) Field of Classification Search
  CPC .......... H04M 1/72519; H04W 52/027; H04W 12/06; H04W 88/02; Y02B 60/50
  USPC .................. 455/566; 345/173–178; 713/182; 715/863
  See application file for complete search history.

(56) References Cited

U.S. PATENT DOCUMENTS

| | | | |
|---|---|---|---|
| 2005/0253817 A1 | 11/2005 | Rytivaara et al. | |
| 2006/0075250 A1* | 4/2006 | Liao | H04M 1/72519 713/182 |
| 2006/0238517 A1* | 10/2006 | King | G06F 1/1626 345/173 |
| 2008/0254839 A1* | 10/2008 | Lee | 455/566 |
| 2009/0199130 A1* | 8/2009 | Tsern | G04G 21/08 715/810 |
| 2009/0249235 A1 | 10/2009 | Kim et al. | |
| 2010/0023858 A1* | 1/2010 | Ryu | G06F 3/0416 715/702 |
| 2010/0056220 A1* | 3/2010 | Oh | G06F 1/1616 455/566 |
| 2010/0081475 A1 | 4/2010 | Chiang et al. | |
| 2010/0097970 A1* | 4/2010 | Jang | H04M 1/72544 370/311 |
| 2011/0261015 A1* | 10/2011 | Lu et al. | 345/175 |
| 2011/0273475 A1* | 11/2011 | Herz | G06F 1/1616 345/659 |
| 2011/0283241 A1 | 11/2011 | Miller et al. | |
| 2012/0011467 A1 | 1/2012 | Sung | |
| 2012/0017169 A1 | 1/2012 | Chiu et al. | |
| 2012/0032979 A1* | 2/2012 | Blow et al. | 345/647 |
| 2012/0084734 A1* | 4/2012 | Wilairat | G06F 21/36 715/863 |
| 2012/0133484 A1* | 5/2012 | Griffin | G06F 21/51 340/5.54 |
| 2012/0133604 A1* | 5/2012 | Ishizuka | G06F 1/1624 345/173 |
| 2012/0169617 A1 | 7/2012 | Mäenpää | |
| 2012/0169776 A1* | 7/2012 | Rissa et al. | 345/676 |
| 2012/0306781 A1* | 12/2012 | Hwang et al. | 345/173 |
| 2013/0055159 A1* | 2/2013 | Levine et al. | 715/810 |
| 2013/0093728 A1* | 4/2013 | Oh | G06F 3/016 345/175 |
| 2013/0215041 A1* | 8/2013 | Kim | G06F 3/04883 345/173 |
| 2013/0300985 A1* | 11/2013 | Bulda | 349/86 |
| 2013/0326395 A1* | 12/2013 | Oh | G06F 3/041 715/781 |
| 2016/0202825 A1 | 7/2016 | Tang | |

* cited by examiner (a)

(b)

(d)

(c)

⇨ PLAY NEXT MUSIC

⇨ PLAY PREVIOUS MUSIC

⇨ TURN UP VOLUME

⇨ TURN DOWN VOLUME (a)      (b)

(c)

MOBILE TERMINAL AND METHOD FOR CONTROLLING THE SAME

CROSS REFERENCE TO RELATED APPLICATIONS

Pursuant to 35 U.S.C. §119(a), this application claims the benefit of earlier filing date and right of priority to Korean Application No. 10-2013-0143208, filed on Nov. 22, 2013, the contents of which is incorporated by reference herein in its entirety.

BACKGROUND OF THE INVENTION

Field of the Invention

The present invention relates to a mobile terminal for sensing a touch applied to a display unit when the display unit is deactivated, and a method for controlling the same.

Description of the Related Art

Terminals may be generally classified as mobile/portable terminals or stationary terminals. Mobile terminals may also be classified as handheld terminals or vehicle mounted terminals.

Mobile terminals have also become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

However, because of the numerous functions provided on the mobile terminal, a complex graphic user interface is needed. The power requirements of the mobile terminal have also increased significantly.

SUMMARY OF THE INVENTION

Accordingly, one object of the present invention is to address the above noted and other problems with the related art.

Another object of the present invention is to control a mobile terminal by applying a touch to a deactivated display unit.

Still another object of the present invention is to provide a novel and convenient user interface for controlling the mobile terminal.

To achieve these and other advantages and in accordance with the purpose of the present invention, as embodied and broadly described herein, the present invention provides in one aspect a mobile terminal including a terminal body; a wireless communication unit configured to perform wireless communication; a touchscreen display unit configured to switch between an inactivated state in which illumination is not applied to the display unit and an activated state in which illumination is applied to the display unit; and a controller configured to sense at least one of a touch input on the display unit when the display unit is in the inactivated state and no illumination is applied to the display unit, and process a function associated with a touch track of the sensed touch input, based on a tap corresponding to pre-set conditions, wherein when the tap is sensed within a reference period of time from a point in time at which the last touch input of the sensed touch input is released, the controller executes a function associated with the touch track.

In another aspect, the present invention provides a method for controlling a mobile terminal, including: switching, via a touchscreen display unit, between an inactivated state in which illumination is not applied to the display unit and an activated state in which illumination is applied to the display unit; sensing, via a controller, at least one of a touch input on the display unit when the display unit is in the inactivated state and no illumination is applied to the display unit; and when a pre-set tap within a reference period of time from a point in time at which the last touch input of the sensed touch input is released is sensed, executing a function associated with a touch track of the sensed touch input.

Further scope of applicability of the present invention will become apparent from the detailed description given hereinafter. However, the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE INVENTION

The embodiments of the present invention will now be described with reference to the accompanying drawings, in which like numbers refer to like elements throughout although the embodiments are different, and a description of the like elements a first embodiment will be used for those of the different embodiment.

Mobile terminals described in the present invention may include mobile phones, smart phones, notebook computers, tablet computers, digital broadcast receivers, PDAs (Personal Digital Assistants), PMPs (Portable Multimedia Player), navigation devices, slate PCs, tablet PCs, ultrabooks, and the like. However, it would be understood by a person skilled in the art that the configuration according to embodiments of the present invention can be also applicable to the fixed types of terminals such as digital TVs, desk top computers, and the like, except for any elements especially configured for a mobile purpose.

Figure 1:
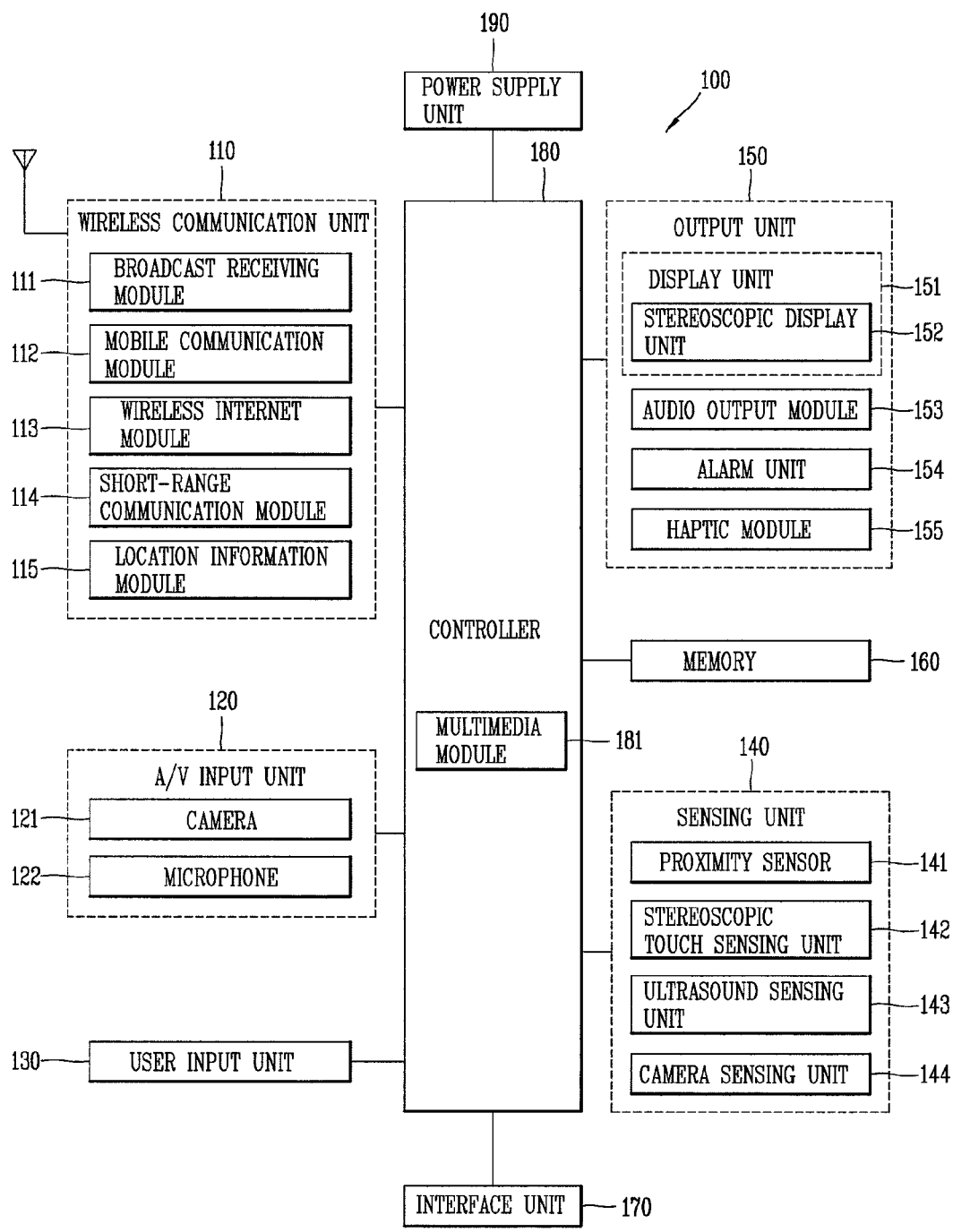
FIG. 1 is a block diagram of a mobile terminal according to an embodiment of the present invention.

FIG. 1 is a block diagram of a mobile terminal according to an embodiment of the present invention. The mobile terminal 100 may include a wireless communication unit 110, an A/V (Audio/Video) input unit 120, a user input unit 130, a sensing unit 140, an output unit 150, a memory 160, an interface unit 170, a controller 180, and a power supply unit 190, etc. FIG. 1 shows the mobile terminal as having various components, but implementing all of the illustrated components is not a requirement. Greater or fewer components may alternatively be implemented.

The wireless communication unit 110 typically includes one or more modules allowing radio communication between the mobile terminal 100 and a wireless communication system or a network in which the mobile terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may refer to information associated with a broadcast channel, a broadcast program or a broadcast service provider. The broadcast associated information may also be provided via a mobile communication network, and this instance, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160.

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The wireless Internet module 113 supports wireless Internet access for the mobile terminal. This module may be internally or externally coupled to the terminal. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile terminal. A typical example of the location information module is a GPS (Global Positioning System).

With reference to FIG. 1, the A/V input unit 120 is configured to receive an audio or video signal. The A/V input unit 120 may include a camera 121 and a microphone 122. The camera 121 processes image data of still pictures or video obtained by an image capture device in a video capturing mode or an image capturing mode. The processed image frames may be displayed on a display unit 151.

The image frames processed by the camera 121 may be stored in the memory 160 (or other storage medium) or transmitted via the wireless communication unit 110. Two or more cameras 121 may be provided according to the configuration of the mobile terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 for the phone call mode. The microphone 122 may implement various types of noise canceling (or suppression) algorithms to cancel (or suppress) noise or interference generated in the course of receiving and transmitting audio signals.

The user input unit 130 may generate input data from commands entered by a user to control various operations of the mobile terminal. The user input unit 130 may include a keypad, a dome switch, a touch pad, a jog wheel, a jog switch, and the like.

The sensing unit 140 detects a current status (or state) of the mobile terminal 100 such as an opened or closed state of the mobile terminal 100, a location of the mobile terminal 100, the presence or absence of user contact with the mobile terminal 100 (i.e., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. As shown in FIG. 1, the sensing unit 140 may include a stereoscopic touch sensing unit 142, ultra-sound sensing unit 143 and camera sensing unit 144.

The output unit 150 is configured to provide outputs in a visual, audible, and/or tactile manner (e.g., audio signal, video signal, alarm signal, vibration signal, etc.). The output unit 150 may include the display unit 151, an audio output module 153, an alarm unit 154, a haptic module 155, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of them may be configured to be transparent or light-transmissive to allow viewing of the exterior, which may be called transparent displays. A typical transparent display may be, for example, a TOLED (Transparent Organic Light Emitting Diode) display, or the like. Through such configuration, the user can view an object positioned at the rear side of the terminal body through the region occupied by the display unit 151 of the terminal body.

The mobile terminal 100 may include two or more display units according to its particular desired embodiment. For example, a plurality of display units may be separately or integrally disposed on one surface of the mobile terminal, or may be separately disposed on mutually different surfaces.

Meanwhile, when the display unit 151 and a sensor (referred to as a 'touch sensor', hereinafter) for detecting a touch operation are overlaid in a layered manner to form a touch screen, the display unit 151 may function as both an input device and an output device. The touch sensor may have a form of a touch film, a touch sheet, a touch pad, and the like.

The touch sensor may be configured to convert pressure applied to a particular portion of the display unit 151 or a change in the capacitance or the like generated at a particular portion of the display unit 151 into an electrical input signal. The touch sensor may be configured to detect the pressure when a touch is applied, as well as the touched position and area.

When there is a touch input with respect to the touch sensor, a corresponding signal (signals) are transmitted to a touch controller. The touch controller processes the signals and transmits corresponding data to the controller 180. Accordingly, the controller 180 can recognize which portion of the display unit 151 has been touched. The display unit 151 can also include a stereoscopic display unit 152 for displaying 3D images, for example.

With reference to FIG. 1, a proximity sensor 141 may be disposed within or near the touch screen. The proximity sensor 141 is a sensor for detecting the presence or absence of an object relative to a certain detection surface or an object that exists nearby by using the force of electromagnetism or infrared rays without a physical contact. Thus, the proximity sensor 141 has a considerably longer life span compared with a contact type sensor, and it can be utilized for various purposes.

Examples of the proximity sensor 141 may include a transmission type photoelectric sensor, a direct reflection type photoelectric sensor, a mirror-reflection type photoelectric sensor, an RF oscillation type proximity sensor, a capacitance type proximity sensor, a magnetic proximity sensor, an infrared proximity sensor, and the like. When the touchscreen is the capacitance type, the proximity of the pointer is detected by a change in electric field according to the proximity of the pointer. In this instance, the touchscreen (touch sensor) may be classified as a proximity sensor.

For the sake of brevity, recognition of the pointer positioned to be close to the touchscreen will be called a 'proximity touch', while recognition of actual contacting of the pointer on the touchscreen will be called a 'contact touch'. In this instance, when the pointer is in the state of the proximity touch, it means that the pointer is positioned to correspond vertically to the touch screen.

By employing the proximity sensor 141, a proximity touch and a proximity touch pattern (e.g., a proximity touch distance, a proximity touch speed, a proximity touch time, a proximity touch position, a proximity touch movement state, or the like) can be detected, and information corresponding to the detected proximity touch operation and the proximity touch pattern can be output to the touch screen.

The audio output module 153 can convert and output as sound audio data received from the wireless communication unit 110 or stored in the memory 160 in a call signal reception mode, a call mode, a record mode, a voice recognition mode, a broadcast reception mode, and the like. Also, the audio output module 153 may provide audible outputs related to a particular function performed by the mobile terminal 100 (e.g., a call signal reception sound, a message reception sound, etc.). The audio output module 153 may include a speaker, a buzzer, or other sound generating device.

The alarm unit 154 may provide outputs to inform about the occurrence of an event of the mobile terminal 100. Typical events may include call reception, message reception, key signal inputs, a touch input etc. In addition to audio or video outputs, the alarm unit 154 may provide outputs in a different manner to inform about the occurrence of an event. For example, the alarm unit 154 may provide an output in the form of vibrations. When a call, a message, or some other incoming communication is received, The alarm unit 154 can provide tactile outputs (i.e., vibrations) to inform the user thereof. By providing such tactile outputs, the user can recognize the occurrence of various events even if his mobile phone is in the user's pocket. Outputs informing about the occurrence of an event may be also provided via the display unit 151 or the audio output module 152. The display unit 151 and the audio output module 153 may be classified as a part of the alarm unit 153.

The haptic module 155 generates various tactile effects the user may feel. A typical example of the tactile effects generated by the haptic module 155 is vibration. The strength and pattern of the haptic module 155 can be controlled. For example, different vibrations may be combined to be output or sequentially output.

In addition vibration, the haptic module 155 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 155 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a phonebook, messages, still images, video, etc.) that are input or output. In addition, the memory 160 may store data regarding various patterns of vibrations and audio signals output when a touch is input to the touch screen.

The memory 160 may include at least one type of storage medium including a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port.

When the mobile terminal 100 is connected with an external cradle, the interface unit 170 may serve as a passage to allow power from the cradle to be supplied therethrough to the mobile terminal 100 or may serve as a passage to allow various command signals input by the user from the cradle to be transferred to the mobile terminal therethrough. Various command signals or power input from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 can perform a pattern recognition processing to recognize a handwriting input or a picture drawing input performed on the touchscreen as characters or images, respectively. Also, when a state of the mobile terminal satisfies pre-set conditions, the controller 180 can execute a locked state for limiting an input of a control command of the user with respect to applications. Also, in a locked state, the controller 180 can control a locked screen displayed on the locked state based on a touch input sensed through the display unit.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof. For a hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For a software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

Figure 2A:
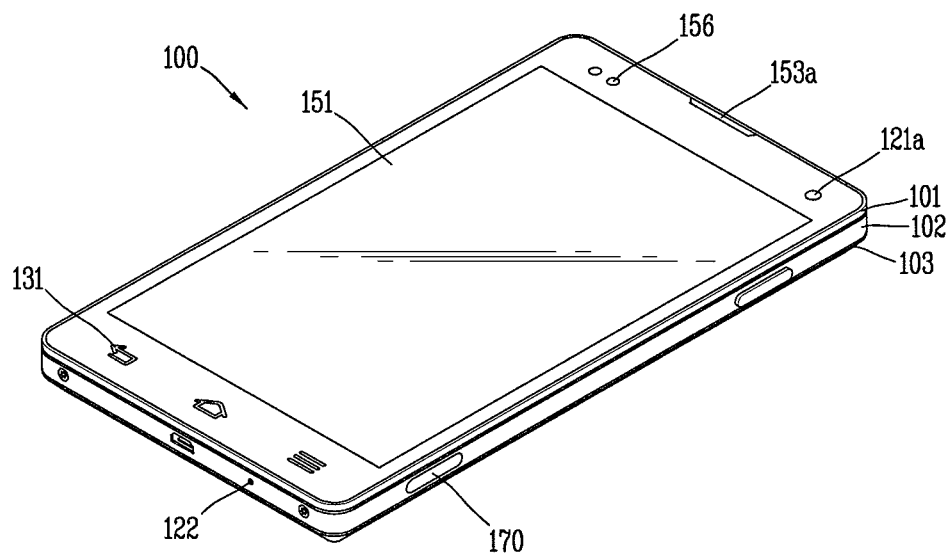
FIG. 2A is a front perspective view of the mobile terminal according to an embodiment of the present invention.
Figure 2B:
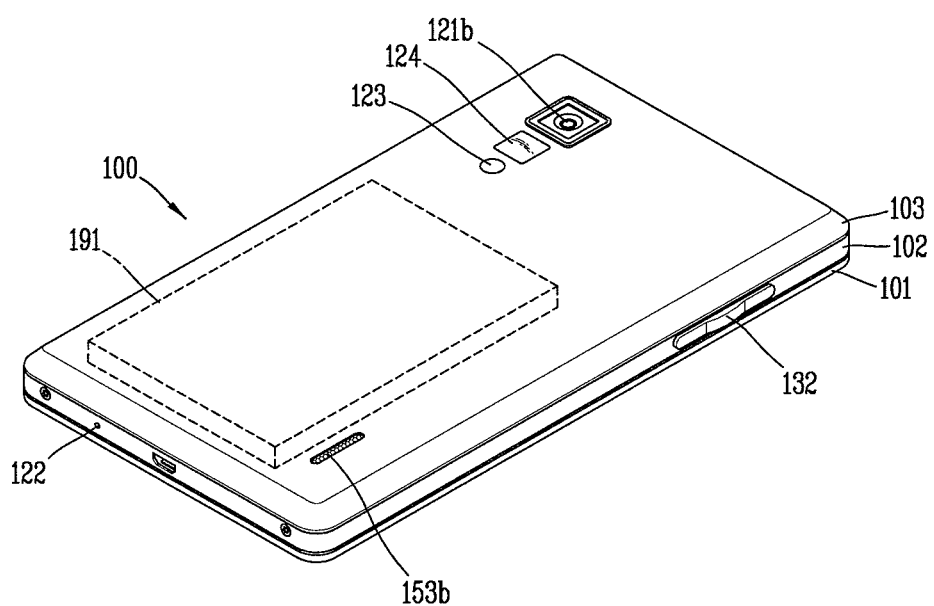
FIG. 2B is a rear perspective view of the mobile terminal illustrated in FIG. 2A.

Next, FIG. 2A is a front perspective view of the mobile terminal according to an embodiment of the present invention, and FIG. 2B is a rear perspective view of the mobile terminal illustrated in FIG. 2A. The disclosed mobile terminal has a bar type terminal body. However, the present invention is not limited thereto and may be applicable to various structures such as a slide type mobile terminal, a folder type mobile terminal, a swing type mobile terminal, a swivel type mobile terminal, etc., in which two or more bodies are combined to be relatively movable.

As illustrated, the terminal body 100 (referred to as 'body', hereinafter) includes a front surface, a lateral surface, and a rear surface. Also, the body includes both ends formed in a length direction. The body includes a case (or casing, housing, cover, etc.) constituting the external appearance. In this embodiment, the case may include a front case 101 and a rear case 102.

Various electronic components are installed in the space between the front case 101 and the rear case 102. One or more intermediate cases may be additionally disposed between the front case 101 and the rear case 102. The cases may be formed by injection-molding a synthetic resin or may be made of a metallic material such as stainless steel (STS) or titanium (Ti), etc.

The display unit 151, the audio output module 153a, the camera 121a, the user input unit 130/131, 132, the microphone 122, the interface unit 170, etc. may be disposed mainly on the front case 101 of the terminal body 100. The display unit 151 occupies the most of a main surface of the front case 101. The audio output unit 151 and the camera 121a are disposed at a region adjacent to one end portion among both end portions of the display unit 151, and the user input unit 131 and the microphone 122 are disposed at a region adjacent to another end portion.

The user input unit 132 and the interface unit 170 may be disposed at the sides of the front case 101 and the rear case 102. The microphone 122 may be disposed on the other end of the body 100. The user input unit 130 is manipulated to receive a command for controlling the operation of the mobile terminal 100 and may include a plurality of manipulation units 131 and 132. The manipulation units 131 and 132 may be generally referred to as a manipulating portion, and various methods and techniques can be employed for the manipulation portion so long as they can be operated by the user in a tactile manner.

Content input by the first and second manipulation units 131 and 132 can be variably set. For example, the first manipulation unit 131 may receive a command such as starting, ending, scrolling, etc., and the second manipulation unit 132 may receive a command such as controlling of the size of a sound output from the audio output module 153a or conversion into a touch recognition mode of the display unit 151.

Meanwhile, a light emitting unit 156 may be disposed in an upper end region of the body 100, and includes at least one light emitting diode (LED). The light emitting unit 156 may turn on lighting in various manners under the control of the controller 180. Here, the various manners may refer to that a color of lighting, a period of flickering, brightness, and the like, are different.

With reference to FIG. 2B, an audio output unit 153b may be additionally disposed on the rear surface of the terminal body. The audio output module 153b may implement stereophonic sound functions in conjunction with the audio output module 153a (see FIG. 2A) and may be also used for implementing a speaker phone mode for call communication.

The power supply unit 190 for supplying power to the mobile terminal 100 is mounted on the terminal body. The power supply unit 190 may be installed within the terminal body or may be directly attached to or detached from the exterior of the terminal body.

A touch pad for detecting a touch may be additionally mounted on the rear case 102. The touch pad may be configured to be light transmissive like the display unit 151. In this instance, when the display unit 151 is configured to output visual information from both sides thereof, the visual information may be recognized also via the touch pad. Alternatively, a display may be additionally mounted on the touch pad so that a touchscreen may be disposed on the rear case 102.

A camera 121b may additionally be disposed on the rear case 102 of the terminal body. The camera 121b may have an image capture direction which is substantially opposite to that of the camera 121 (see FIG. 2A), and have a different number of pixels than the camera 121a.

For example, the camera 121a may have a smaller number of pixels to capture an image of the user's face and transmit such image to another party, and the camera 121b may have a larger number of pixels to capture an image of a general object and not immediately transmit it in most cases. The cameras 121a and 121b may be installed on the terminal body such that they can be rotatable or popped up.

A flash 123 and a mirror 124 may be additionally disposed adjacent to the camera 121b. When an image of a subject is captured with the camera 121b, the flash 123 illuminates the subject. The mirror 124 allows the user to see himself when he wants to capture his own image (i.e., self-image capturing) by using the camera 121b.

An audio output unit 153b may be additionally disposed on the rear surface of the terminal body. The audio output unit 153n may implement a stereoscopic function along with the audio output module 153a (see FIG. 2A), and may be used for implementing a speaker phone mode during call communication.

A power supply unit 190 for supplying power to the mobile terminal 100 may be installed on the terminal body and includes battery 191. The power supply unit 190 may be installed in the terminal body or may be directly detached from the outside of the terminal body.

The touch pad for detecting a touch may be additionally mounted on the rear case 102. Such a touch pad may be configured to be light-transmissive like the display unit 151. In this instance, when the display unit 151 is configured to output visual information from both surfaces thereof, the visual information may be recognized also through the touch pad. The information output to the both surfaces of the display unit 151 may be controlled by the touch pad. Also, a display unit may be additionally mounted on the touch pad, so a touchscreen may be disposed on the rear case 102.

The touch pad is operated in association with the display unit 151 of the front case 101. The touch pad may be disposed to be parallel on the rear side of the display unit 151. The touch pad may have the same size as the display unit 151 or smaller.

Also, the mobile terminal according to an embodiment of the present invention including at least one or more of the components as described above includes a sensing unit for sensing at least one of a touch applied to the display unit when the display unit is deactivated and a tap applied to the terminal body. The mobile terminal executes a function associated with a touch track applied to the display unit based on a tap applied within a reference period time when the display unit is deactivated. The user may form a touch track by using a touch and execute at least one of functions executable in the mobile terminal through a simple gesture of tapping an object. Thus, the user may omit a process of turning on the display unit and searching for an icon of a function desired to be executed.

Hereinafter, a mobile terminal providing a novel user interface based on a touch track and a tap when a display unit is deactivated, and a method for controlling the same will be described in detail along with the accompanying drawings. In particular, FIG. 3 is a flow chart illustrating a method of controlling of a mobile terminal according to an embodiment of the present invention.

Figure 3:
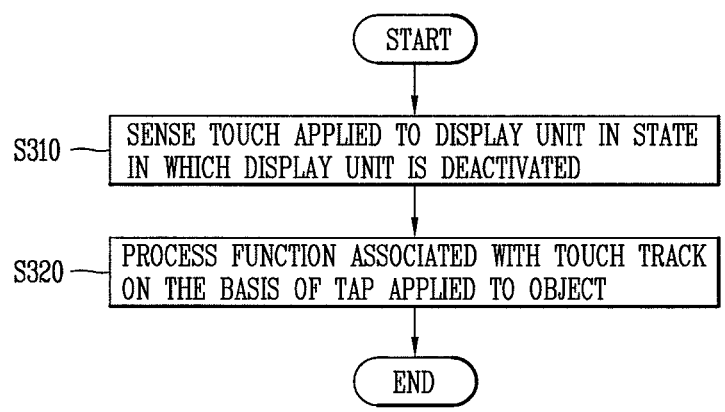
FIG. 3 is a flow chart illustrating a method of controlling of a mobile terminal according to an embodiment of the present invention.

Referring to FIG. 3, a touch applied to the display unit 151 is sensed when the display unit 151 is deactivated (S310). In addition, the "state in which the display unit 151 is deactivated" refers to a state in which light provided in the mobile terminal 100 to illuminate the display unit 151 is in an OFF state. That is, when the display unit 151 is deactivated, no information or graphic image is displayed on the display unit 151.

Meanwhile, the sensing unit 140 senses a touch applied to the display unit 151 regardless of whether the display unit 151 is activated. The sensing unit 140 may be, for example, a touch sensor. Here, the sensing unit 140 can sense a touch according to different schemes according to whether to display unit 151 is activated. For example, when the display unit 151 is activated, it is necessary to immediately react to a user input, so the sensing unit 140 executes an active mode in which the activated state is maintained.

Further, when the display unit 151 is deactivated, a doze mode in which the sensing unit 140 is activated and deactivated at every pre-set period is executed. That is, when the display unit 151 is deactivated, the sensing unit 140 executes the doze mode and is activated at every pre-set period, which is less than the activated mode.

As the period at which the sensing unit 140 is activated is shorter, a speed at which a touch applied to the display unit 151 is sensed is increased, but in this instance, power consumed by the sensing unit 140 is also increased. Further, as the period at which the sensing unit 140 is activated is longer, power consumed by the sensing unit 140 is reduced but a speed at which a touch applied to the display unit 151 is sensed is reduced.

Thus, the pre-set period may be set such that, in sensing a touch applied to the display unit 151, a sensing speed thereof is as fast as possible not to be recognized by the user, while increasing efficiency of power consumption. For example, the pre-set period may be set such that sensing unit 140 is activated thirty times (30 Hz) per second. This may be a minimum current level at which the display unit 151 may recognize a touch applied thereto in a deactivated state.

Meanwhile, the sensing unit 140 executes a doze mode when the display unit 151 is deactivated, and in this instance, if the touch applied to the display unit 151 is continuously moved without being released from the first touch point, the sensing unit 140 executes the active mode. That is, when the display unit 151 is deactivated, and when it is determined that a touch track is applied, the sensing unit 140 executes the active mode in order to more accurately track the touch track. For example, the sensing unit 140 may be set to be activated by 120 times (120 Hz) per second in the active mode.

Meanwhile, if a tap to be described in the following step S320 is not sensed within a predetermined period of time from a point in time at which the touch is released, the sensing unit 140 may switch the active mode to the doze mode. This prevents generation of malfunction of the mobile terminal that may be caused by a touch not intended by the user.

Next, a function associated with the touch track is processed based on the tap (S320). Further, the touch track refers to a movement trace of the touch applied to the display unit 151. In more detail, the touch track refers to a track formed as an object applying a touch input moves from a first spot of the display unit 151 which was first touched to a second spot from which the touch is released.

In this instance, the touch track may be generated by at least one touch. That is, a touch track may be generated by a single touch and by a plurality of touches. When a touch track is generated by a plurality of touches, the controller 180 can sense an order in which the touches are applied and tracks of respective touches, as a single touch track.

Meanwhile, when a touch track is generated by a plurality of touches, only when the plurality of touches are applied within the reference period of time, the controller 180 can determine that a 'single touch track' aiming at controlling of the mobile terminal has been sensed. For example, when a first touch track is generated by a first touch and a second touch is applied within a reference period of time from a point in time at which the first touch is released, the first touch track and a second touch track generated by the second touch may be sensed as a single touch track. When the reference period of time from the point in time at which the first touch was released has passed, the controller 180 can disregard the first touch.

Meanwhile, the sensing unit 140 can sense a first spot to which a touch is first applied and a second spot from which the touch is released, and sense a touch movement from the first spot to the second spot in a time-series manner.

Further, the controller 180 searches for a function associated with the touch track sensed by the sensing unit 140. The function associated with the touch track is matched to the touch track and refers to all types of function that may be executed or driven in the mobile terminal. For example, one of the functions associated with the touch track may be an application installed in the mobile terminal. That is, "a certain function is executed" corresponds to "a certain application is executed or driven."

In another example, the function associated with the touch track may be a function of generating an event. Here, the event may be a message origination event, a call origination event, and the like or the event may be an event generated by an application installed in the mobile terminal.

In still another example, the function associated with the touch track may be a function required for basic driving of the mobile terminal. For example, the function required for basing driving of the mobile terminal may correspond to turning on or off lighting provided in the display unit 151, switching the mobile terminal from an unlocked state to a locked state or from a locked state to an unlocked state, establishing a communication network, changing configuration information of the mobile terminal, and the like.

In addition, the memory 140 can store a particular touch track and a function associated with the particular touch track, and can compare the sensed touch track with touch tracks stored in the memory 140 to search for a function associated with the sensed touch track. That is, a plurality of touch tracks may exist and different functions may be matched to respective touch tracks. The controller 180 processes functions varied according to sensed touch tracks.

The touch tracks and functions associated with the touch tracks may be stored in the memory 160 when released from the factory or may be added, deleted, or edited by the user of the terminal. A method of adding a touch track by the user will be described later with reference to FIGS. 11A and 11B.

Meanwhile, when a touch applied to the display unit 151 is released, the controller 180 can output information related to a touch track by using the output unit 150. The information related to a touch track may include information regarding whether a function associated with the touch track has been searched, information regarding a name and type of a searched function, information indicating that a tap should be applied to execute the searched function, information regarding a reference time for which a tap is applied, and the like.

The controller 180 can output the information related to the touch track according to any one of visual, audible, and tactile method. For example, using a light emitting unit (for example, a light emitting diode) disposed on the front surface of the terminal body, when a function associated with the touch track is found, blue lighting may be turned on, and when a function associated with the touch track is not found, red lighting may be turned on.

Using a color, flickering, and the like, of light, information related to functions associated with the touch track may be output in different manners. In addition, the display unit 151 may be activated to display the information related to the touch track, or the audio output module 153 may be used to output the information related to the touch track as a sound. Accordingly, the user can check the information related to the touch track.

Further, the function associated with the touch track may be executed when a pre-set tap is sensed within the reference period of time from a point in time at which a sensed touch is released. That is, when the controller senses a pre-set tap within the reference period of time from a point in time at which a touch forming a touch track is released, the controller 180 can execute a function associated with the touch track.

In addition, a tap or a tapping gesture can denote a gesture hitting or tapping the body of the mobile terminal 100 or an object associated with the mobile terminal 100. More specifically, the tap may be understood as an operation of slightly hitting the mobile terminal body 100 or object with a tap object such as a finger and the like or an operation of allowing a tap object to be slightly brought into contact with the mobile terminal body or object.

The tap object applying such a tap may be a thing or object capable of applying an external force to the mobile terminal body 100, for example, finger (part with a fingerprint), stylus pen, pen, pointer, first, and the like. Further, the tap object is not limited, and the type thereof varies if it is a thing capable of applying an external force to the mobile terminal body 100.

When one or more taps are applied within the reference period of time from a point in time at which the sensed touch is released, the controller 180 can determine that a tap for executing a function associated with the touch track has been sensed. In this instance, the reference period of time may be a very short time such as a period of time within 300 ms to 2 s.

In addition, an object to which a tap is applied may include at least one of the body of the mobile terminal and an object on which the mobile terminal is placed. In other words, the input region of the mobile terminal may be extended to an outside of the terminal body. Accordingly, a spot outside of the terminal body, from which a tap is sensed, may be a virtual input region.

The virtual input region may also vary in the area according to a location or object on which the terminal is placed or the strength of a tap. For example, when the terminal is placed on a table, the movement of the terminal may be generated if the user hits the table, thereby sensing the tap therethrough. As a result, the virtual input region is increased as increasing the strength of the hitting. In another example, when the user holds the terminal body, the virtual input region may disappear.

In response to a tap corresponding to pre-set conditions, the controller 180 can execute a function associated with the touch track. Here, the pre-set conditions may be related to at least one of a number of taps, a position of a tap, a speed of a tap, strength of a tap, a pattern of a tap, and a region to which a tap is applied. For example, only when taps are successively applied twice, the controller 180 can execute the function associated with the touch track. This is to prevent the function associated with the touch track from being executed by a touch not intended by the user.

Thus, only when at least two or more taps (or a plurality of taps) are successively applied within a limited period of time, the sensing unit 140 may generate a control signal for executing the function associated with the touch track. Further, successively sensing at least two or more taps within a limited period of time may be referred to as "knockknock (or knock-on)." This is similar to a person knocking on the door, a counterpart inside the door may respond, and if the user of the terminal taps the mobile terminal by "knockknock," the controller 180 executes a corresponding function.

In addition, when a second tap is sensed within a limited period of time from a time point at which a first tap is sensed, the controller 180 can determine that "knockknock" is sensed. Accordingly, hereinafter, sensing "knockknock" is denoted as hitting an object on the terminal body or at a position out of the body is substantially sensed a plural number of times.

Further, regarding "knockknock," after a first tap tapping the terminal body or a spot outside the terminal body by a first reference number of times or more is sensed, a second tap tapping the terminal body or a spot outside the terminal body by a second reference number of times or more is sensed. The first and second reference number of times may be equal or different. For example, the first reference number of times may be three times and the second reference number of times may be two times. In another example, the first and second reference number of times may be two or more times.

In addition, the first and second taps of "knockknock" may be input in various patterns. For example, an operation of lightly tapping an object may correspond to a dot of Morse code, and an operation of not releasing a contact during a predetermined period of time in an object-contacted state may correspond to a dash (line) of the Morse code. For example "knockknock," "knock-knock," "knockknock-" may be when two taps are applied but may be tap gestures generated in different patterns.

However, in the following description, the mobile terminal according to an embodiment of the present invention will be described by using an example in which first and second reference number of times are one time and have the same pattern.

In addition, when the first and second taps are sensed within the limited period of time, the sensing unit 140 can determine that "knockknock" is sensed when the first and second taps are applied within a predetermined region. For example, "knockknock" may refer to a plurality of times of tapping successively sensed within a predetermined region within the limited period of time.

Also, the limited period of time may be a very short time. For example, the limited period of time may be a time within 300 ms to 2 s. The predetermined region may be a spot to which the first and second taps were applied or a narrow region that may be considered as the same spot. Thus, when the first tap applied to the mobile terminal body or an object is sensed by the sensing unit 140, the sensing unit 140 can calculate a predetermined region from the spot in which the first tap was sensed. After the first tap, when a second tap applied to the predetermined region is sensed within a limited period of time after the first tap was sensed, the sensing unit 140 can determined that "knockknock" has been sensed.

In addition, the foregoing reference period of time and the predetermined region may be variously modified according to an embodiment. Also, in the mobile terminal according to the embodiment of the present invention, a tap may be sensed by at least one of the accelerometer and the touch sensor included in the sensing unit 140.

In more detail, the accelerometer is a sensor for measuring dynamic force such as acceleration, vibration, impact, or the like, of the terminal body. The accelerometer can determine whether a tap is applied to an object by sensing a movement (or vibration) of the terminal body generated by a tap gesture. Thus, the accelerometer can sense a tap applied to the terminal body or a tap applied to an object positioned as close as the terminal body enough to sense whether a movement or vibration is generated in the terminal body.

Thus, the sensing unit 140 can sense a tap applied to a spot outside of the terminal body, as well as a tap applied to the terminal body, as long as a movement or a vibration of the terminal body is sensed. Further, the sensing unit 140 can sense both the first and second taps by using the touch sensor or the accelerometer. In addition, the sensing unit 140 can synthetically determine whether a tap has been applied by using at least one of the touch sensor and the accelerometer. For example, when the display unit 151 is deactivated, the touch sensor consuming a large amount of power can be deactivated and only the accelerometer can be maintained in an activated state. In this instance, when the first tap is sensed by the accelerometer, the sensing unit 140 can activate the touch sensor to sense the second tap by using the accelerometer and the touch sensor. In such a case, the power consumption is reduced and the taps may be more accurately sensed.

Meanwhile, when the function associated with the touch track is a superordinate function, the controller 180 can select at least one of subordinate functions included in the superordinate function based on a tap according to pre-set conditions and execute a selected subordinate function. Here, the pre-set conditions can be a number of applied taps, a position of a tap, a speed of a tap, strength of a tap, a pattern of a tap, a region to which a tap is applied, etc. For example, only when two taps are successively applied (or tapping is successively applied twice), the controller 180 can execute the function associated with the touch track.

In another example, when the superordinate function associated with the touch track corresponds to a call origination function, and when a first tap applied to the terminal body by a first reference number of times is sensed, the controller 180 can execute the call origination function with respect to a first counterpart, and when a second tap applied to the terminal body by a second reference number of times, different from the first reference number of times, is sensed, the controller 180 can perform a call origination function with respect to a second counterpart.

In still another example, when the superordinate function associated with the touch track corresponds to a function of activating a camera and displaying an image captured by the camera on the display unit 151, and when a tap applied to an upper region of the display unit 151 is sensed, the controller 180 can activate a camera disposed on a front surface of the mobile terminal, and when a tap applied to the lower region is sensed, the controller 180 can activate a camera disposed on a rear surface of the terminal body.

In another example, the superordinate function associated with the touch track may be matched to a function of dividing the entire region of the display unit 151 into a plurality of regions. When the touch track is moved from a left end of the terminal body to a right end of the terminal body, the controller 180 can divide the display unit 151 into an upper region and a lower region based on the touch track as a reference line. Thereafter, when a tap is applied within the preference period of time, the controller 180 can activate any one of the upper region and the lower region based on characteristics of the tap. The controller 180 can execute different subordinate functions according to the characteristics of the tap and display an executed screen corresponding to the executed subordinate function in the activated partial region of the display unit 151.

That is, in response to a sensed touch, the controller 180 can switch the terminal to a ready state (or an activated state), and when a tap is applied, the controller 180 can control the terminal accordingly. A function controlled by the controller 180 can be varied according to at least one of a touch track and characteristics of a tap.

Thus, according to an embodiment of the present invention, the controller 180 can control at least one of functions executed in the mobile terminal based on a touch track and a tap. In this instance, the controller 180 can execute a function associated with the touch track and switch the display unit 151 from a deactivated state to an activated state. Also, the controller 180 can display an executed screen according to execution of a function on the display unit 151.

Further, the function associated with the touch track may vary according to a state of the terminal. The controller 180 can execute a locked state according to a user control or a locked state execution setting. For example, when an input for switching to a locked state is applied by the user, the terminal is switched to a locked state. In addition, when execution conditions of a pre-set locked state are met, the locked state may be executed. In this instance, the locked state may be when the user should input a password to use the terminal. Accordingly, the use of the terminal by a third party may be prevented.

In this instance, the controller 180 can classify functions associated with the touch track into a function executable in the locked state and a function unexecutable in the locked state. For example, when a touch track corresponds to a signature indicating the user in a user-specific manner, the function associated with the touch track may correspond to a function (hereinafter, referred to as a 'signature function') of releasing a locked state and displaying an executed screen of the most recently executed application. That is, the signature function may be executed even in a locked state. Further, when a function that cannot be executed in a locked state, although a touch track is sensed, the controller 180 can disregard it or display a locked screen formed to input a password on the display unit 151.

In addition, with respect to a touch track that may be input only according to a user intention, a tap may not be required. That is, when a partial touch track that cannot be erroneously input is applied, a function associated with the partial touch track may be executed immediately when a touch is released. For example, when a signature unique to the user is input as a touch track, although a tap based on pre-set conditions is not input, the controller 180 can release a locked state of the terminal and display a home screen page. The unique signature may serve as a password that may be input only by the user.

According to the driving scheme as described above, various functions desired by the user can be immediately executed based on a touch and a tap when the display unit 151 is deactivated, implementing a simple user interface. Also, because several execution icons are mixed in a home screen including a plurality of pages, the user has difficulty in finding an icon desired to be executed or several user inputs must be applied to execute an icon. The foregoing example resolves such shortcomings. Thus, even when the display unit 151 is deactivated, the user can control the terminal in a novel manner.

Figure 4A:
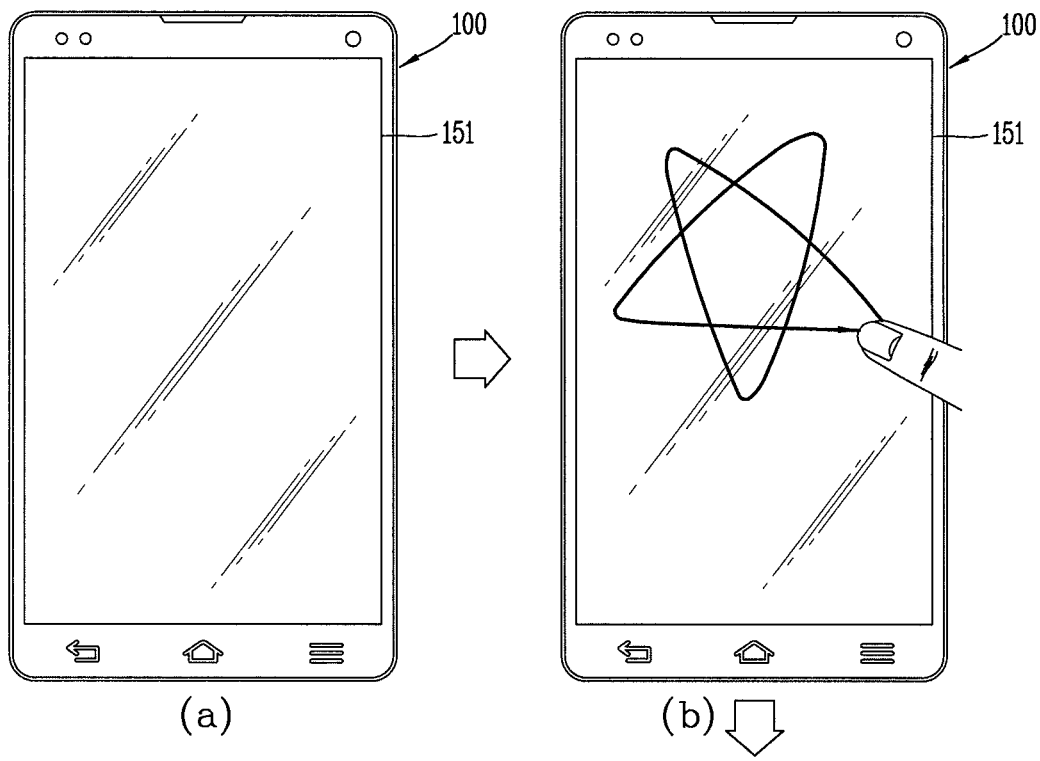
FIGS. 4A and 4B are conceptual views illustrating the control method of FIG. 3.
Figure 4B:
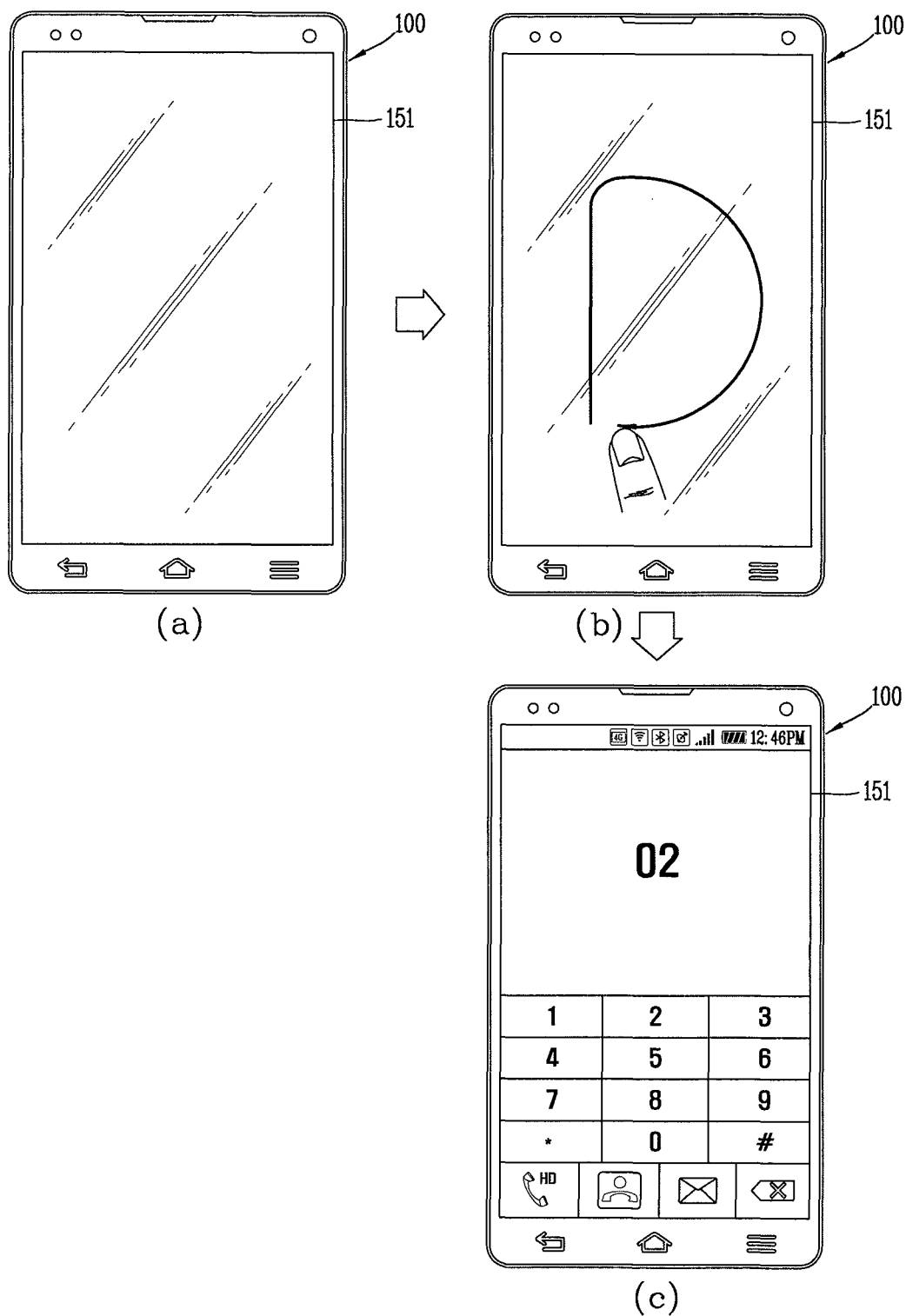

Next, FIGS. 4A and 4B are conceptual views illustrating the control method of FIG. 3, and FIG. 5 is a view illustrating various touch tracks that may be applied to a mobile terminal according to an embodiment of the present invention.

As illustrated in (a) of FIG. 4A, even when (or in an OFF state) the display unit 151 is deactivated, a touch applied to the display unit 151 of the mobile terminal or a tap applied to an object may be sensed. Thus, when a touch is applied to the deactivated display unit 151, the controller 180 can search for a function associated with a touch track.

For example, as illustrated in (b) of FIG. 4A, when a touch track having a star shape is drawn on the display unit 151, the controller 180 can search for a function matched to the star shape. As discussed above, there can be various functions associated with touch tracks, and the controller 180 can select a different function according to a shape of the touch track.

Further, the selected function may be executed only if a tap satisfying pre-set conditions is applied within a reference period of time from a point at which a touch is released. For example, as illustrated in (c) of FIG. 4A, when two taps are successively applied, a function associated the touch track may be executed. A tap for executing the function associated with the touch track, that is, a tap satisfying pre-set conditions, may be variously modified according to an embodiment.

Thereafter, referring to (d) of FIG. 4A, the controller 180 can execute a "function of calling LG Electronics" as a function associated the touch track having the star shape based on the tap, and display an executed screen on the display unit 151. Further, some functions associated with a touch track may be set to be executed simultaneously when a touch track is applied. That is, some functions do not require an application of a tap corresponding to pre-set conditions within the reference period of time.

The controller 180 can also search for a function matched to an applied touch track and determine whether the searched function requires a tap corresponding to pre-set conditions. In this instance, the controller 180 can determine whether the tap is required by using configuration information stored together with the matched function.

When the tap corresponding to the pre-set conditions are required according to the determination result, the controller 180 can wait to receive the tap during a predetermined period of time from a point in time at which a touch is released. In addition, FIG. 4A illustrates the touch track input on the display unit 151 followed by the tapping gesture. However, in an alternative embodiment, the tapping gesture can be followed by the touch track input on the touchscreen display unit to perform a corresponding function.

That is, the tapping gesture can first be input and then touch track input can be performed. In addition, the controller 180 can activate the display unit 151 when the tapping gesture is input on the inactivated touchscreen display unit and display a gesture screen for receiving the touch track input. Thus, the tapping gesture (e.g., double tap) can be input after the touch track gesture, or the touch track gesture can be input after the tapping gesture is input.

Further, when the tap is not required, the controller 180 can execute the function matched to a touch track simultaneously when the matched function is searched or simultaneously when a touch is released. For example, as illustrated in of FIG. 4B(a)-(c), when a touch track (for example, 'D') matched to a dial display function is received, the controller 180 can display a dial screen 420 formed to receive a phone number on the display unit 151 to allow the user to originate a call. Some functions not requiring a tap application may be freely set by the user, and thus, a customized setting environment can be established.

Further, the touch tracks are not limited to the having the star shape, and as illustrated in FIG. 5, in response to touch tracks having various shapes, the controller 180 can execute a function matched to a particular touch track. Meanwhile, in order to increase user intuition, the touch track may be formed as a character shape such as a number, an alphabet, or the like, and the touch track may corresponding to a first letter of a name of a matched function.

Figure 5A:
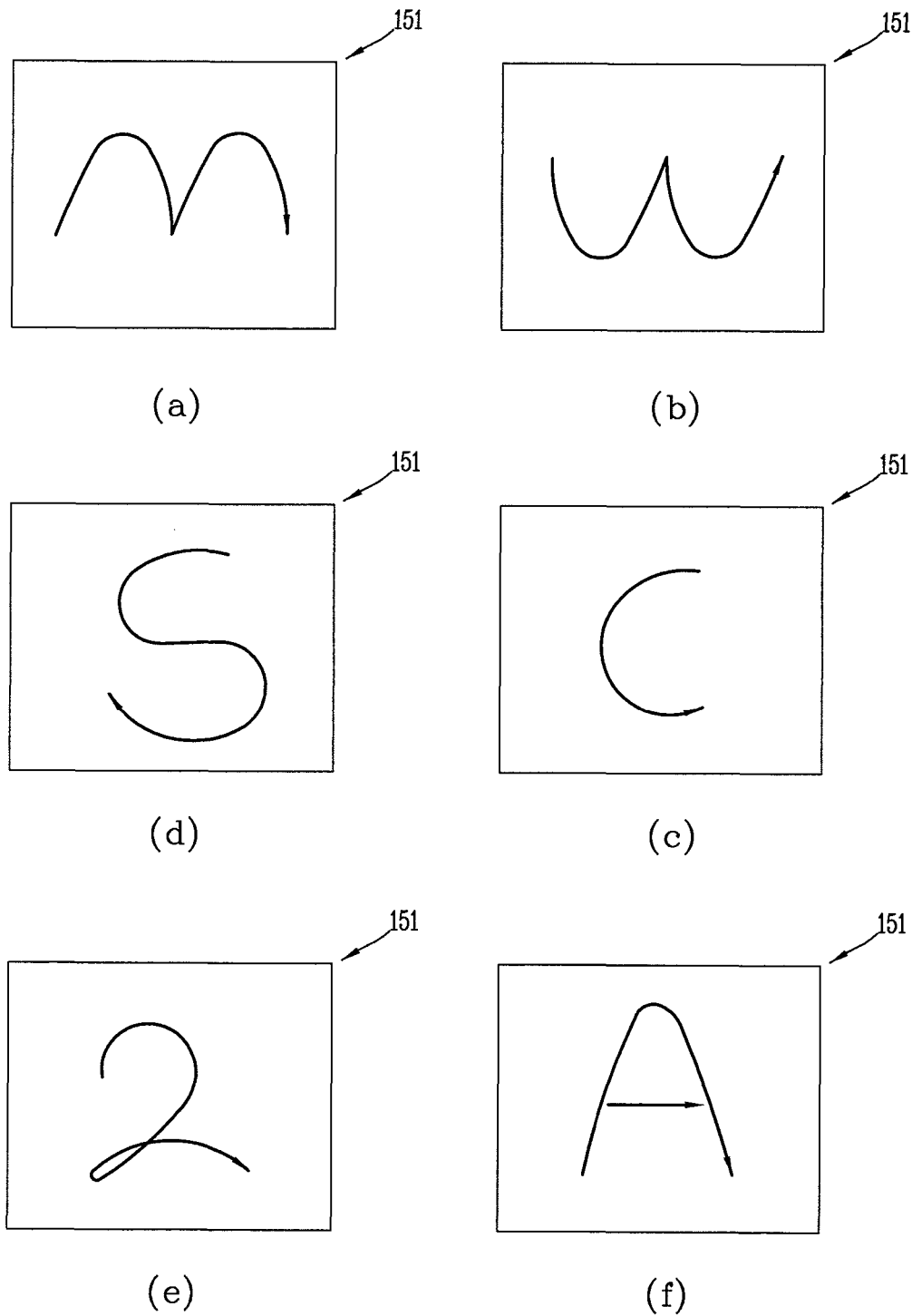
FIGS. 5A and 5B are views illustrating various touch tracks that may be applied to a mobile terminal according to an embodiment of the present invention.
Figure 5B:
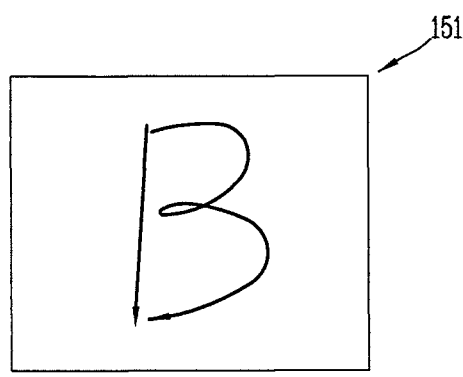
Figure 5B:
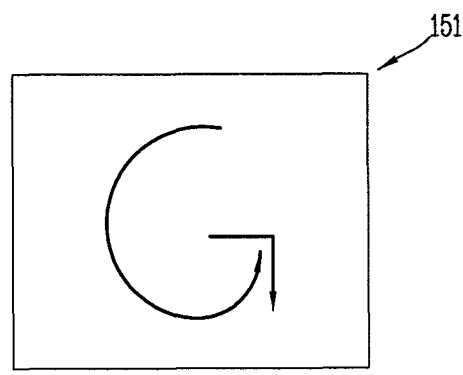
Figure 5B:
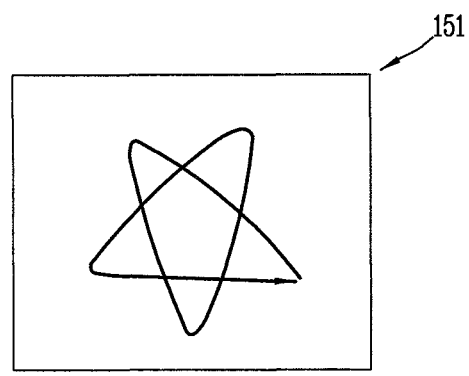
Figure 5B:
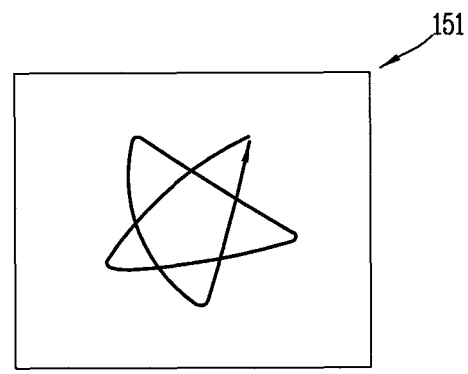

For example, a touch track 'm' as illustrated in (a) of FIG. 5A may be matched to an execution function of an application related to a message, a touch track 'w' as illustrated in (b) of FIG. 5A may be matched to a function of executing a Web browser, and a touch track 'c' as illustrated in (c) of FIG. 5A may be matched to a function of displaying a contact list screen, and a touch track 's' as illustrated in (d) of FIG. 5A may be matched to a function of displaying a setting screen. In another example, a touch track '2' as illustrated in (e) of FIG. 5A may be matched to a control function corresponding to second order among control functions set by the user. In addition, there may be a function of outputting a contact hole (matched to 'L'), a function of executing a particular application (matched to a first letter of an application name), and the like.

In addition, a touch track may have a special shape devised to allow only the user to know in order to keep secret. For example, a touch track having a star shape as illustrated in (c) of FIG. 5B may be matched to a function of releasing a locked state without inputting a password. In addition, although touch tracks have the same shape, the touch tracks may correspond to different touch tracks depending on touch order and direction. For example, in (c) and (d) of FIG. 5B, the touch tracks have the same star shape, but since order and direction in which the touch tracks are formed are different, they are different touch tracks, and thus different functions may be matched thereto.

Thus, in the mobile terminal according to the embodiment of the present invention, different functions may be selected according to touch tracks having different shapes, and selected functions may be processed based on a tap applied to a touch. Also, the different shapes of touch tracks may be shapes generally and conceptually recognized by the user, whereby the controller 180 can provide user experience (UX) more familiar to the user.

Figure 6A:
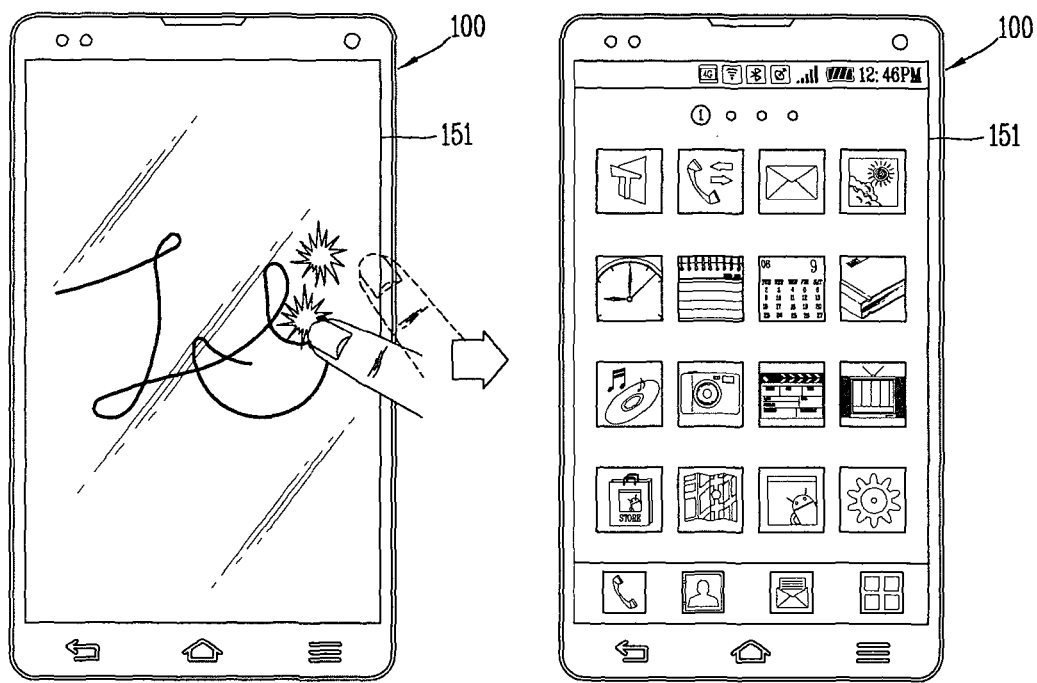
FIGS. 6A, 6B, and 6C are conceptual views illustrating a method of executing a function associated with a touch track in a locked state of a mobile terminal according to an embodiment of the present invention.
Figure 6B:
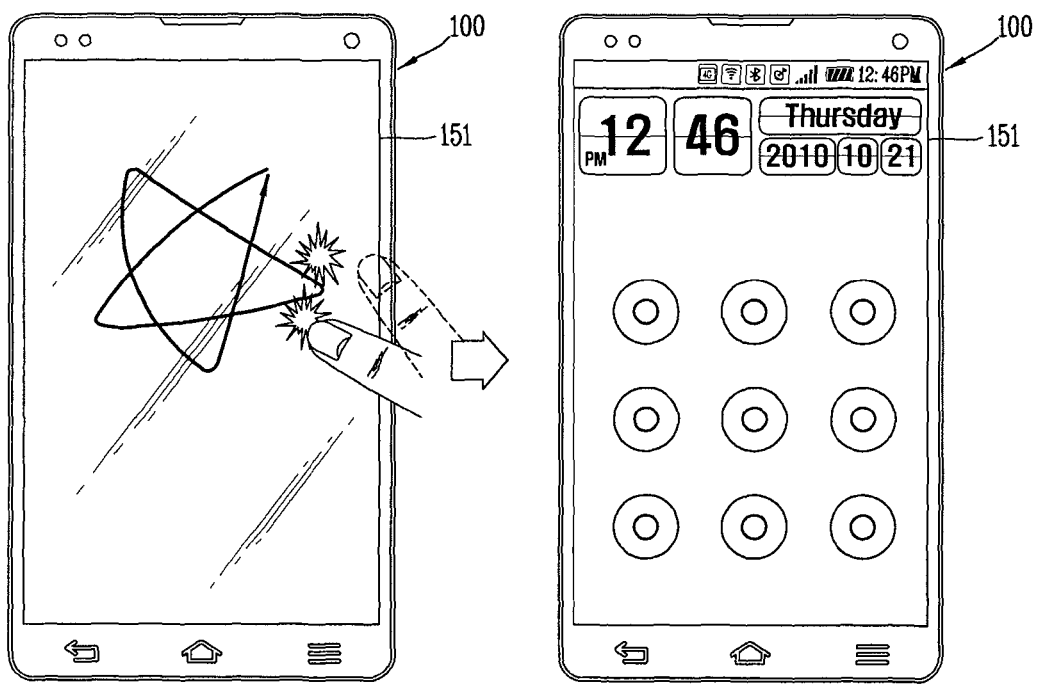

Next, FIGS. 6A and 6B are conceptual views illustrating a method of executing a function associated with a touch track in a locked state of a mobile terminal according to an embodiment of the present invention. In the mobile terminal according to an embodiment of the present invention, a locked state requiring inputting of a password may be activated or deactivated.

In general, when a locked state of a terminal is activated, a password should be input to execute a particular function. For example, when the display unit 151 is activated, the controller 180 displays a locked screen formed to input a password. This is to provide the authority to use the terminal to a particular person and prevent a third party from using the terminal.

Meanwhile, according to the control method described above with reference to FIG. 3, the controller 180 executes a particular function based on a touch and a tap applied to the deactivated display unit 151. However, in a locked state, functions associated with a touch track may be classified into an executable function and an unexecutable function. That is, whether functions associated with a touch track are executable may be set to be different in a locked state.

When a particular function associated with a touch track is set to be executable even in a locked state, the controller 180 cannot require inputting of a password. That is, the controller 180 executes the particular function as a tap is applied, and displays an executed screen of the particular function on the display unit 151. For example, as illustrated in FIG. 6A(a) and (b), when a touch track is matched to a signature function, the controller 180 can release a locked state and display a home screen page. The screen page may include at least one object such as an icon or a widget of an application installed in the mobile terminal.

When the mobile terminal is switched to a released state, a screen which is first output may not be a home screen page. For example, when the mobile terminal is switched to a released state, a screen first output to the display unit 151 may be screen information which has been most recently output to the display unit 151 before the locked state was executed.

Further, when a particular function associated with a touch track is set not to be executed in a locked state, the controller 180 can disregard inputs sensed by the sensing unit 140 or display a locked screen on the display unit 151. For example, the controller 180 can maintain the display unit 151 in a deactivated state, or in another example, as illustrated in FIGS. 6B(a) and (b), the controller 180 can postpone execution of a function (for example, a call origination function) associated with the touch track and display a locked screen. Thereafter, when a proper password is input to the locked screen, the controller 180 can execute the call origination function.

Figure 6C:
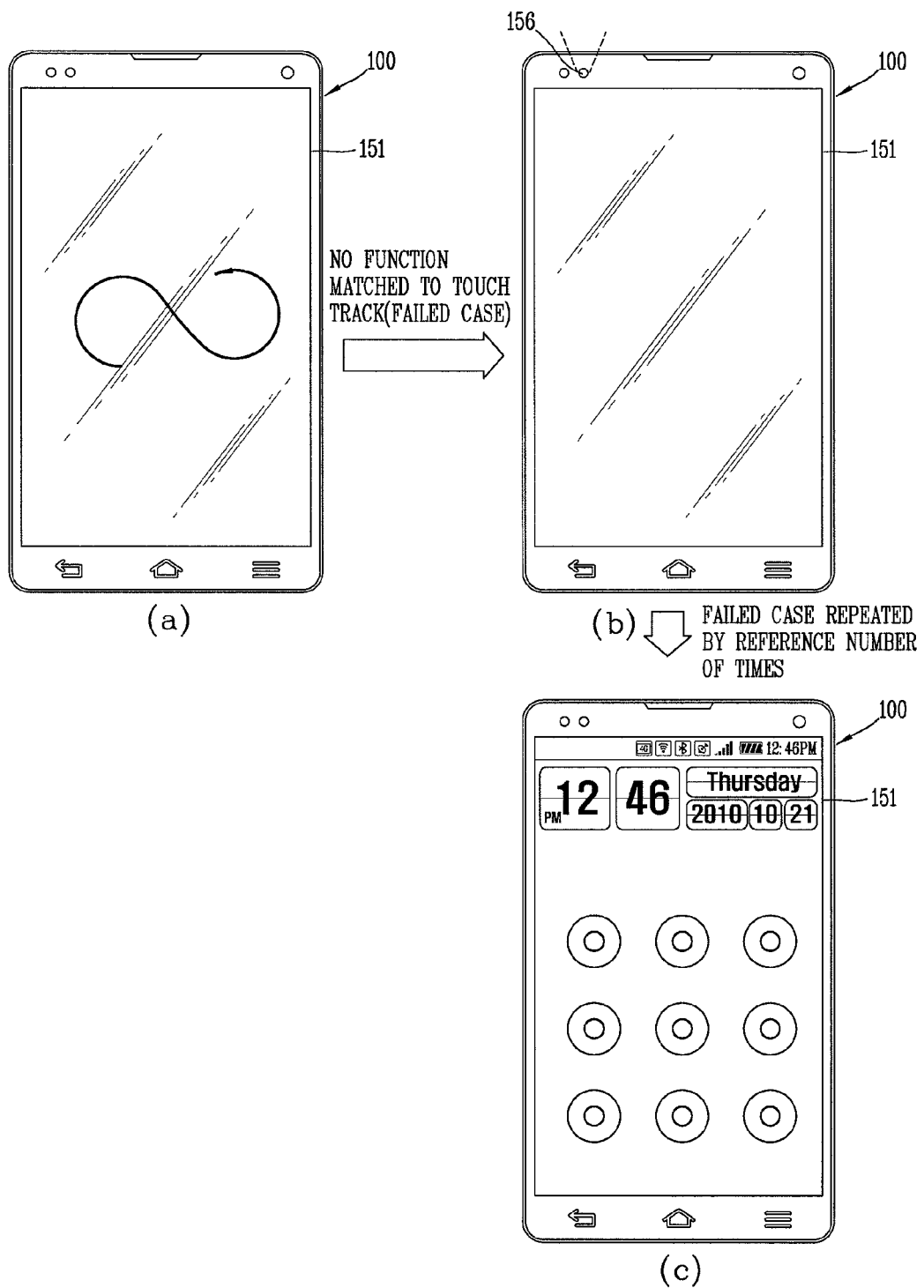

In addition, a "knockknock" may be sensed after a touch is applied to the display unit 151 in a locked state, but there is no function matched to a touch track (this situation will be referred to as a 'failed case', hereinafter). In such a case, when "knockknock" is applied, the controller 180 can guide the user to the fact that there is no function that may be executable (or to the fact that an erroneous touch track has been input) by using a light emitting unit 156. For example, as illustrated in FIGS. 6C(a) and (b), the controller 180 can maintain the display unit 151 in a deactivated state and control the light emitting unit 156 to flicker a plurality of times as red lighting When the failed case is repeated by a reference number of times, as illustrated in (c) of FIG. 6C, the controller 180 can deactivate the display unit 151 and display a locked screen to receive a password. Repeating the failed case corresponds to when the user erroneously inputs or knows a touch track, so the controller 180 can display a locked screen that may be released, on the display unit 151.

Thus, in the mobile terminal according to an embodiment, although the same touch track and tap are applied, different functions may be performed according to a locked state. Thus, the privacy of the terminal user is protected.

Further, in the mobile terminal according to an embodiment of the present invention, guide information related to a touch track may be output in response to a touch applied to the display unit 151. The guide information may be information indicating whether a touch track has been accurately input, information regarding a function associated with the touch track, or information indicating a reference period of time within which a tap is to be applied or information indicating a position to which a tap is to be applied. Also, the guide information may be output through at least one of visual, audible, and tactile methods.

Figure 7:
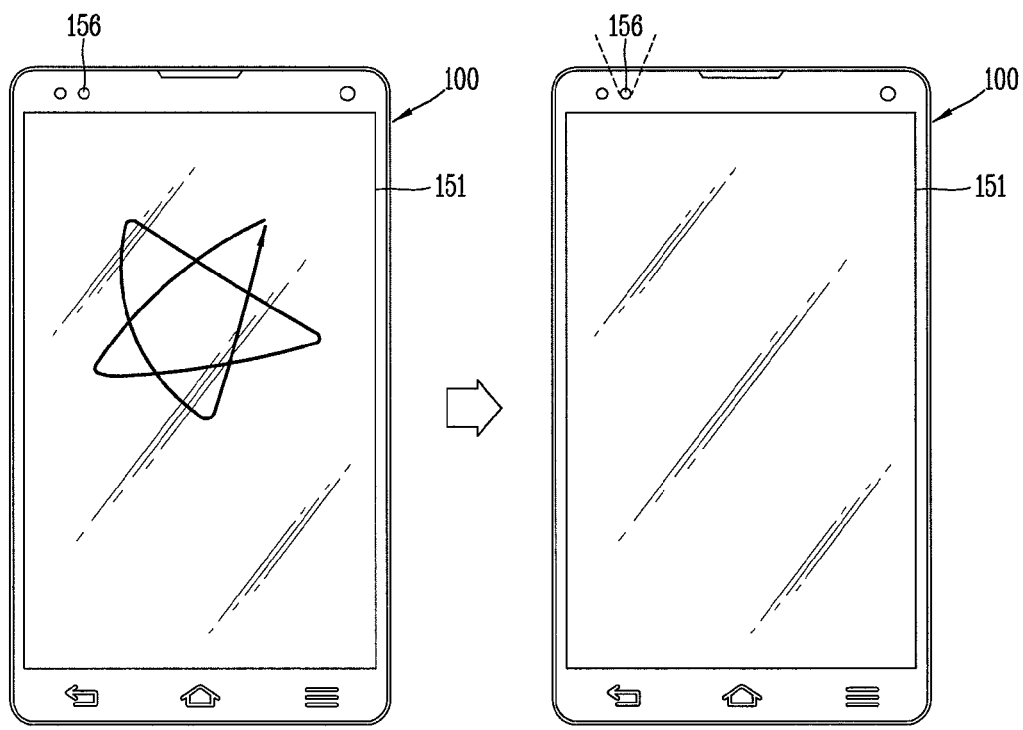
FIGS. 7 and 8 are conceptual views illustrating a method for guiding a function associated with a touch track in a mobile terminal according to an embodiment of the present invention.
Figure 8:
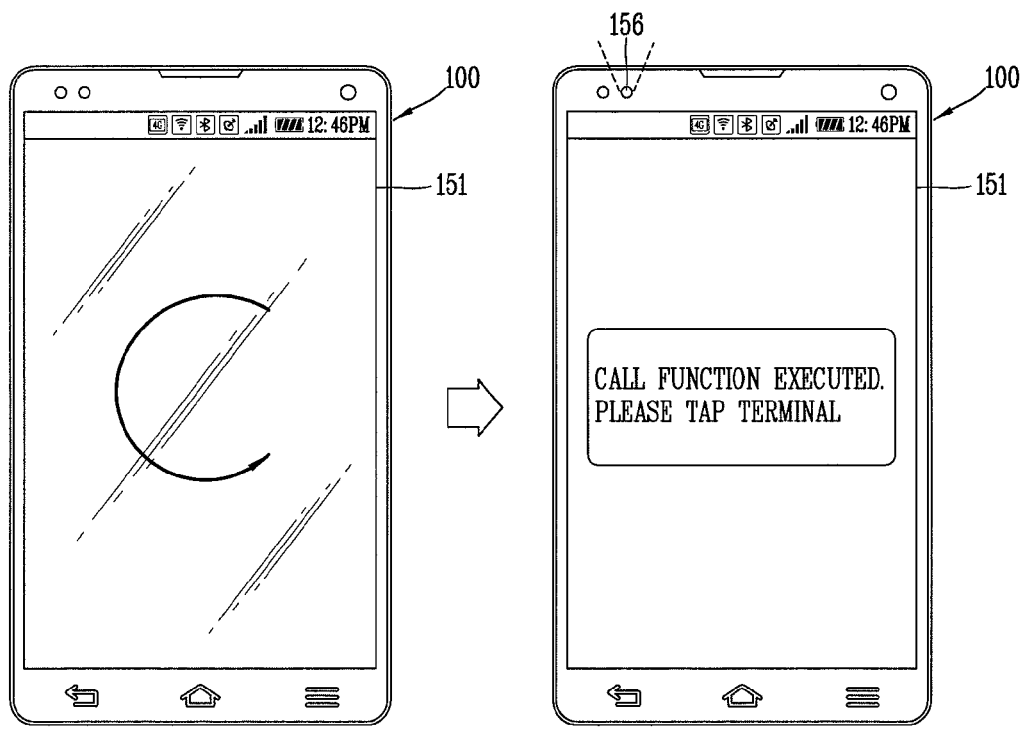

Next, FIGS. 7 and 8 are conceptual views illustrating a method for guiding a function associated with a touch track in a mobile terminal according to an embodiment of the present invention. Referring to FIG. 7, the mobile terminal 100 may include the light emitting unit 156 and the display unit 151. When a touch is applied to the deactivated display unit 151, the controller 180 can turn on the light emitting element 156 based on a touch track formed by a movement of the touch. In this instance, the lighting may be turned on in various manners according to whether a function matched to the touch track exists and according to a type of matched function. The various manners refer to that colors of lighting, brightness of lighting, a number of flashing lighting, a period of flashing, and the like, are different.

For example, as illustrated in FIGS. 7(a) and (b), if a touch track having a star shape is inaccurately applied, the light emitting unit 156 can emit light indicating an erroneous touch has been applied. An erroneous touch refers to a function associated with the touch track not being found. In this instance, the light emitting unit 156 may flicker in a red light, like a traffic light. Further, when a function matched to the touch track exists, the light emitting unit 156 can output blue or green light.

In addition, the light emitting unit 156 can output light in different colors according to types of matched functions, and such setting of lighting may be changed by a user input. For example, when the function associated with the touch track is matched to a call origination function, the light emitting unit 156 can emit red light during a predetermined period of time, and when the function associated with the touch track is matched to a function of executing a message-related application, the light emitting unit 156 can emit yellow light during a predetermined period of time.

In addition, guiding the user with light to apply a tap within the reference period of time from a point in time at which a touch is released may be turned on. For example, as the reference period of time approaches, white light may be output in which a flickering period is gradually shortened. If light is not output any longer, since it means that the reference period of time has passed, a touch track should be newly input. Thus, the user can recognize the reference period of time within which a tap should be applied. In this instance, the display unit 151 is maintained in the deactivated state and only the light emitting unit 156 operates, and thus, power consumed to activate lighting of the display unit 151 is reduced.

As illustrated in FIG. 8, in addition the light emitting unit 156, the controller 180 can provide guide information related to a touch track by using at least one of the display unit 151, the audio output module 153, and the haptic module 155 included in the output unit 150. Further, when guide information is output, and when a touch is applied in a region greater than a predetermined region, the controller 180 can deactivate the light emitting unit 156 and cancel execution of a function associated with a touch track. For example, when a gesture covering the display unit 151 with a palm is sensed, the controller 180 can return the mobile terminal to a state before the touch is applied. Accordingly, the mobile terminal may be controlled in a simpler or more user-friendly method.

In addition, in the mobile terminal according to an embodiment of the present invention, at least one subordinate function may be executed based on characteristics of a tap among subordinate functions included in a superordinate function associated with a touch track. That is, the controller 180 can search for a superordinate function associated with the touch track, and thereafter, the controller 180 can select at least one subordinate function among a plurality of subordinate functions included in the superordinate function. Meanwhile, referring to attributes of a tap, the controller 180 can process different subordinate functions based on a number of applied taps, a position to which a tap is applied, strength of a tap, a speed of a tap, an area of a tap, a pattern of a tap, and the like.

Hereinafter, a method for controlling a mobile terminal based on characteristics of a tap will be described in detail with reference to the accompanying drawings. In particular, FIGS. 9A, 9B, 10A, 10B, and 10C are conceptual vies illustrating a method for executing different functions based on a pre-set tap in a mobile terminal according to an embodiment of the present invention.

First, when the display unit 151 is deactivated (or in an OFF state), a superordinate function associated with a touch track may be selected in response to a touch. Various superordinate functions may be selected according to a touch track, but it is assumed that a touch track matched to a call origination function has been applied for the purposes of description. That is, as illustrated in FIG. 9A, when a superordinate function associated with a touch track having an English letter "C" shape is a call origination function will be described as an example.

When a superordinate function associated with a touch track is selected, the controller 180 can execute different subordinate functions according to characteristics of a tap applied within a reference period of time. In this instance, characteristics of a tap may be related to at least one of a number of applied taps and a position of a tap. That is, when an attribute of a sensed tap corresponds to pre-set conditions, the controller 180 can process a subordinate function previously matched to the applied tap. For example, when a tap having first characteristics is sensed, the controller 180 can process a first subordinate function matched thereto, and when a tap having second characteristics different from the first characteristics is sensed, the controller 180 can process a second subordinate function matched thereto.

Figure 9A:
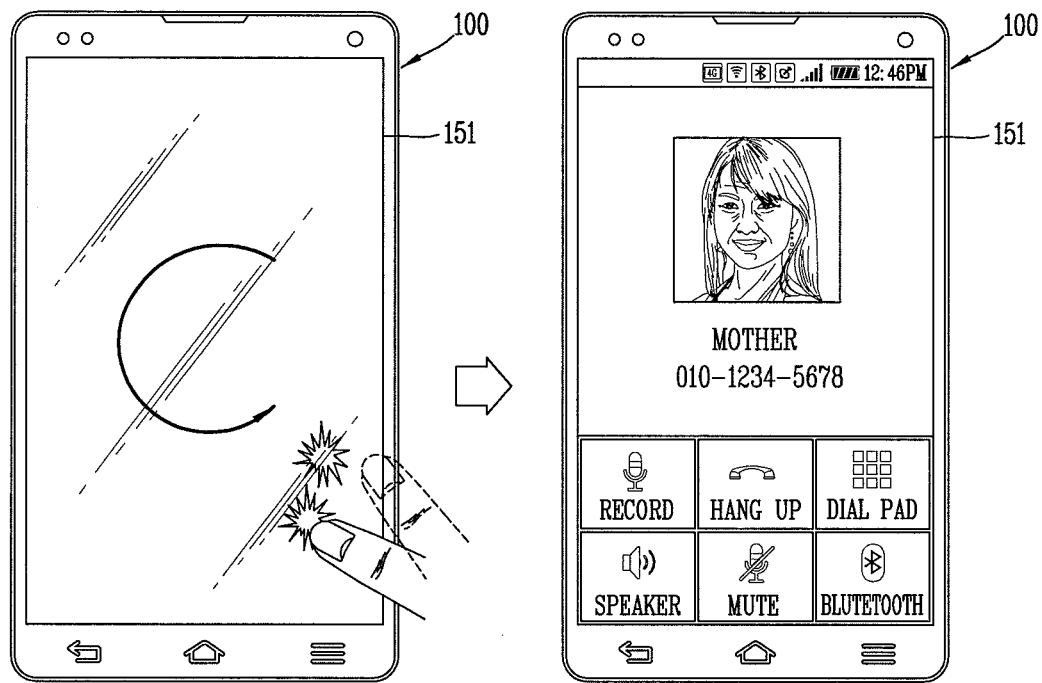
FIGS. 9A, 9B, 10A, 10B, and 10C are conceptual vies illustrating a method for executing different functions based on a pre-set tap in a mobile terminal according to an embodiment of the present invention.
Figure 9B:
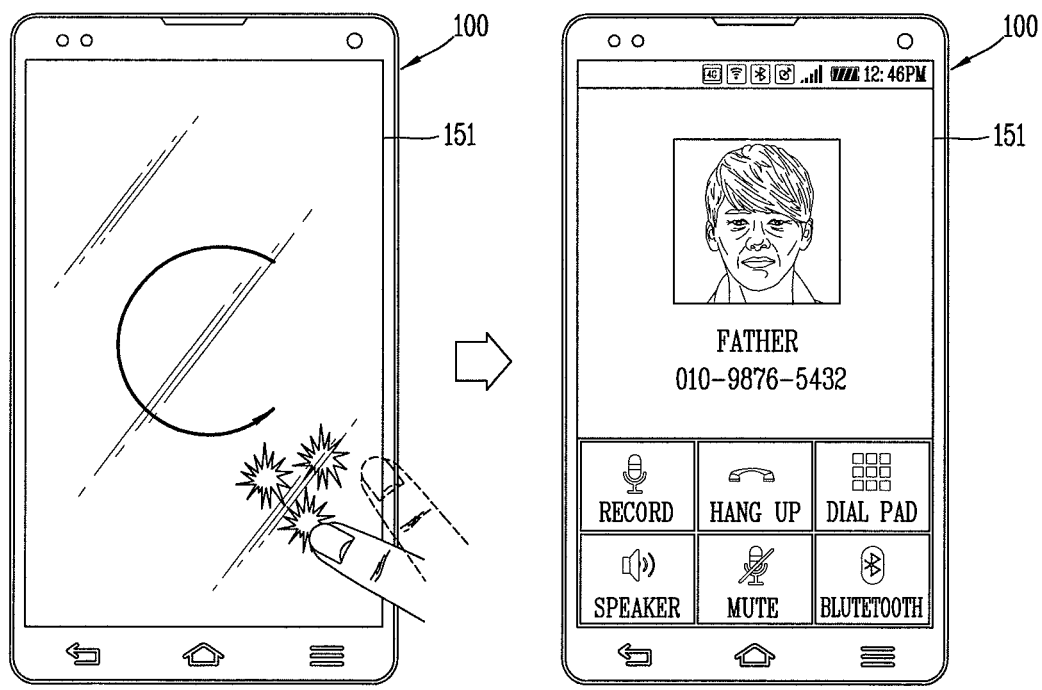

For example, as illustrated in FIGS. 9A(*a*) and (*b*), when a first tap tapping to the terminal body twice is sensed, a function of originating a call to a first counterpart ("mother"), and as illustrated in FIGS. 9B(*a*) and (*b*), when a second tap tapping the terminal body three times is sensed, a function of originating a call to a second counterpart ("father").

Figure 10A:
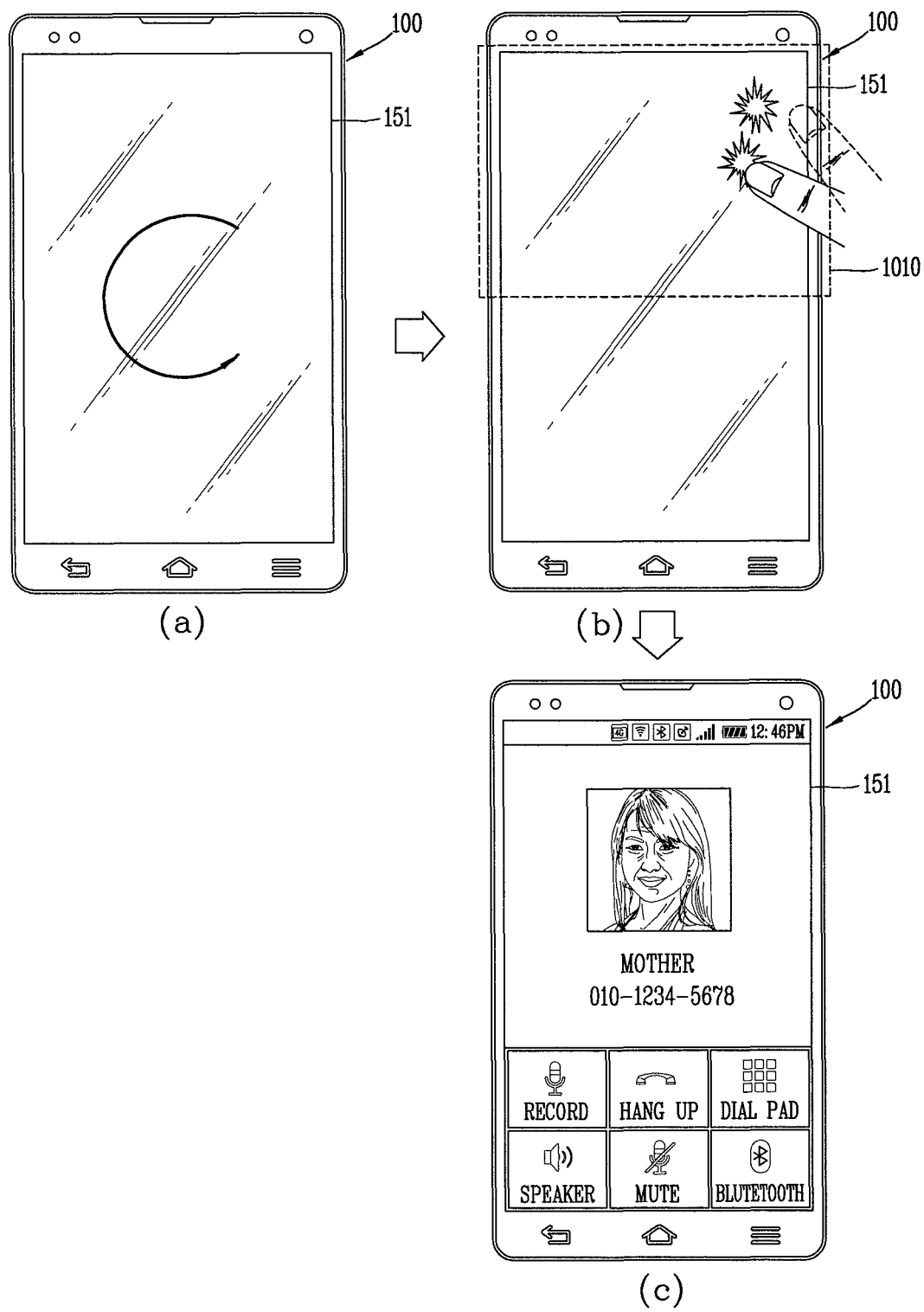
Figure 10B:
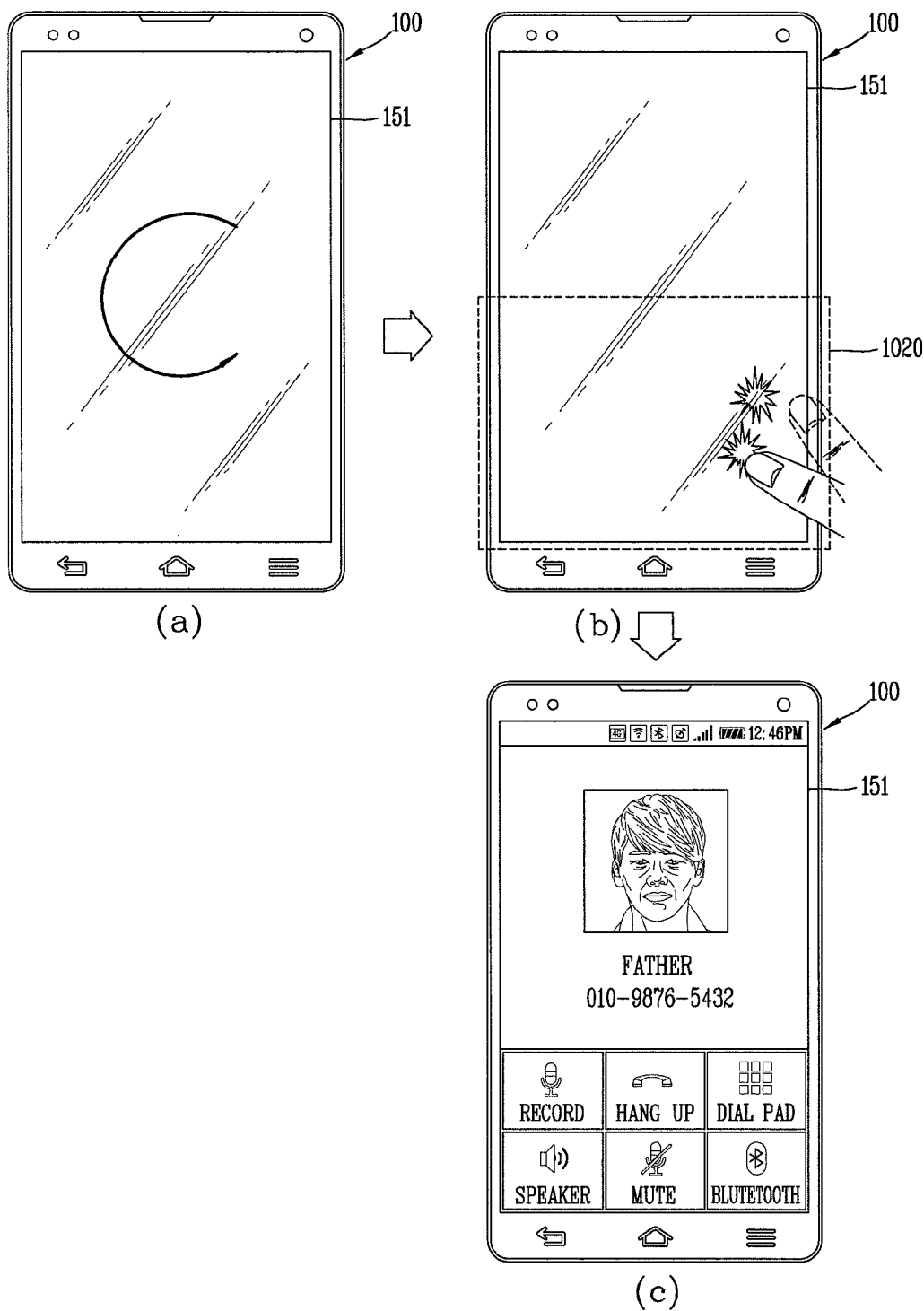

Also, in another example, as illustrated in FIG. 10A(*a*)-(*c*), when a tap is applied to an upper portion 1010 of the display unit 151, the controller 180 can execute a function of originating a call to the first counterpart (mother). Also, as illustrated in FIG. 10B(*a*)-(*c*), when a tap is applied to a lower portion 1020 of the display unit 151, the controller 180 can execute a function of originating a call to the second counterpart (father).

Meanwhile, when a touch applied to the display unit 151 is released, the controller 180 can search for a function associated with a touch track, and output information related to a searched function to the display unit 151. When a superordinate function associated with the touch track includes one or more subordinate functions, the controller 180 can output notification information regarding each of the subordinate functions by using at least one of visual, tactile, and audible methods. Meanwhile, when visual notification information is output, the controller 180 can activate only a portion of the display unit 151 to output the notification information.

Further, when a function matched to the touch track exists and the matched function includes subordinate functions, the controller 180 can display information regarding each of the subordinate functions. For example, as illustrated in (*a*) of FIG. 10C, when the display unit 151 is deactivated, a touch track 'c' matched to a call origination function may be input. The call origination function may include a first subordinate function of originating a call to mother and a second subordinate function of originating a call to father.

Here, when characteristics of a tap for selecting a subordinate function is related to a position to which the tap has been applied, subordinate function information matched to each position may be displayed on the display unit 151. For example, as illustrated in (*b*) of FIG. 10C, the function of originating a call to the first counterpart (mother) is matched to the upper portion 1032 and the function of originating a call to the second counterpart (father) is matched to the lower portion 1034.

Figure 10C:
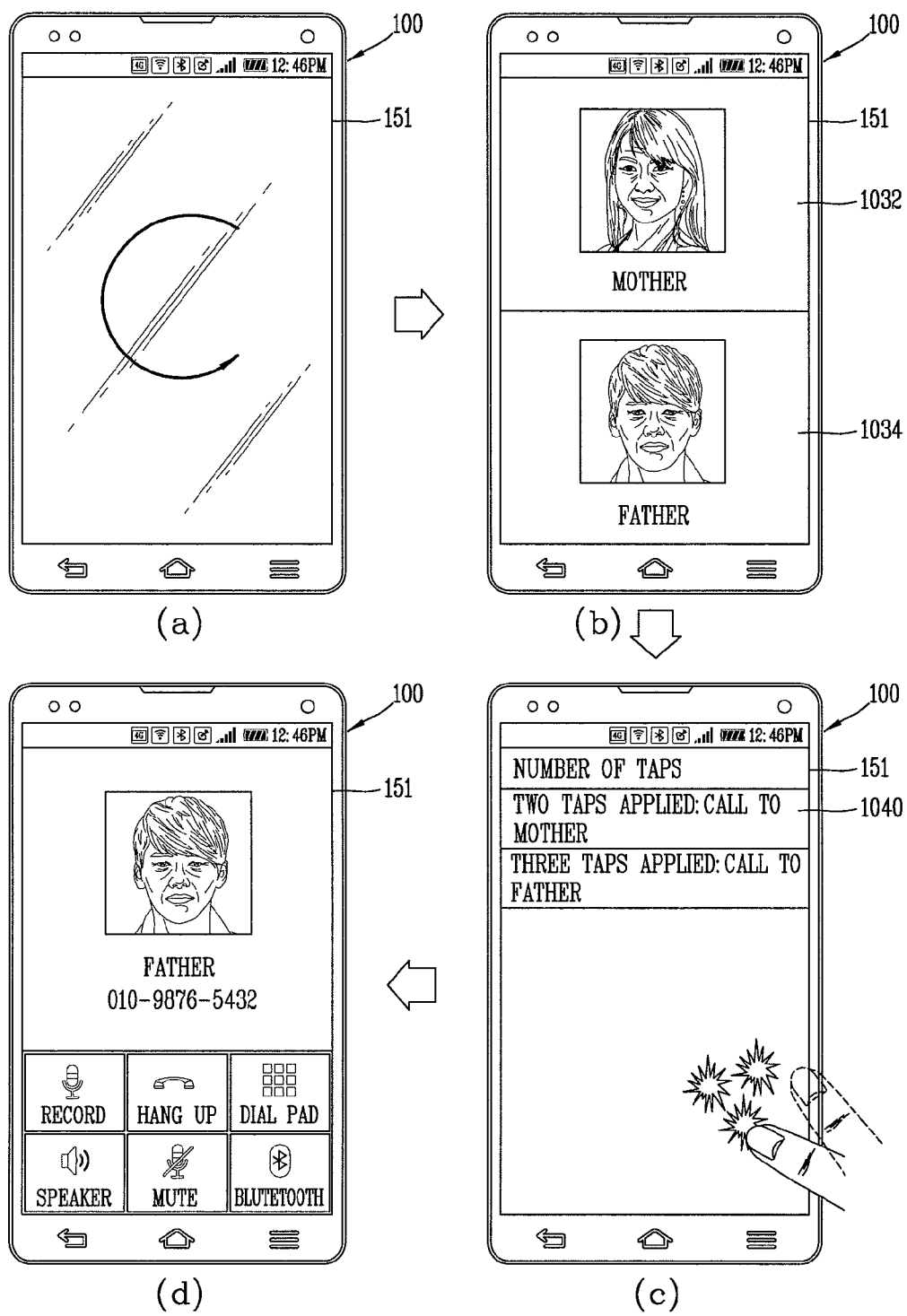

Further, when the characteristics of the tap is related to a number of applied taps, as illustrated in (*c*) of FIG. 10C, information regarding the number of taps and a function matched to the number of taps may be displayed on the display unit 151. In this instance, the notification information includes information regarding the characteristics (or types) of taps that may be input and information regarding functions to be executed based thereon.

Thus, information regarding an executable function and information regarding characteristics of a tap to be applied to execute a particular function may be obtained by using the notification information displayed on the display unit 151 as illustrated in (*d*) of FIG. 10C. Accordingly, user convenience is enhanced.

In addition, when a superordinate function associated with a touch track is a function of activating a camera, functions of activating front and rear cameras may be included as subordinate functions included in the superordinate function. The superordinate and subordinate functions and characteristics of taps matched thereto may be variously modified according to embodiments.

Further, a touch track and a function matched to the touch track may be added or edited by the user. Hereinafter, a touch track and a method for setting functions associated with the touch track in the mobile terminal according to an embodiment of the present invention will be described.

Figure 11A:
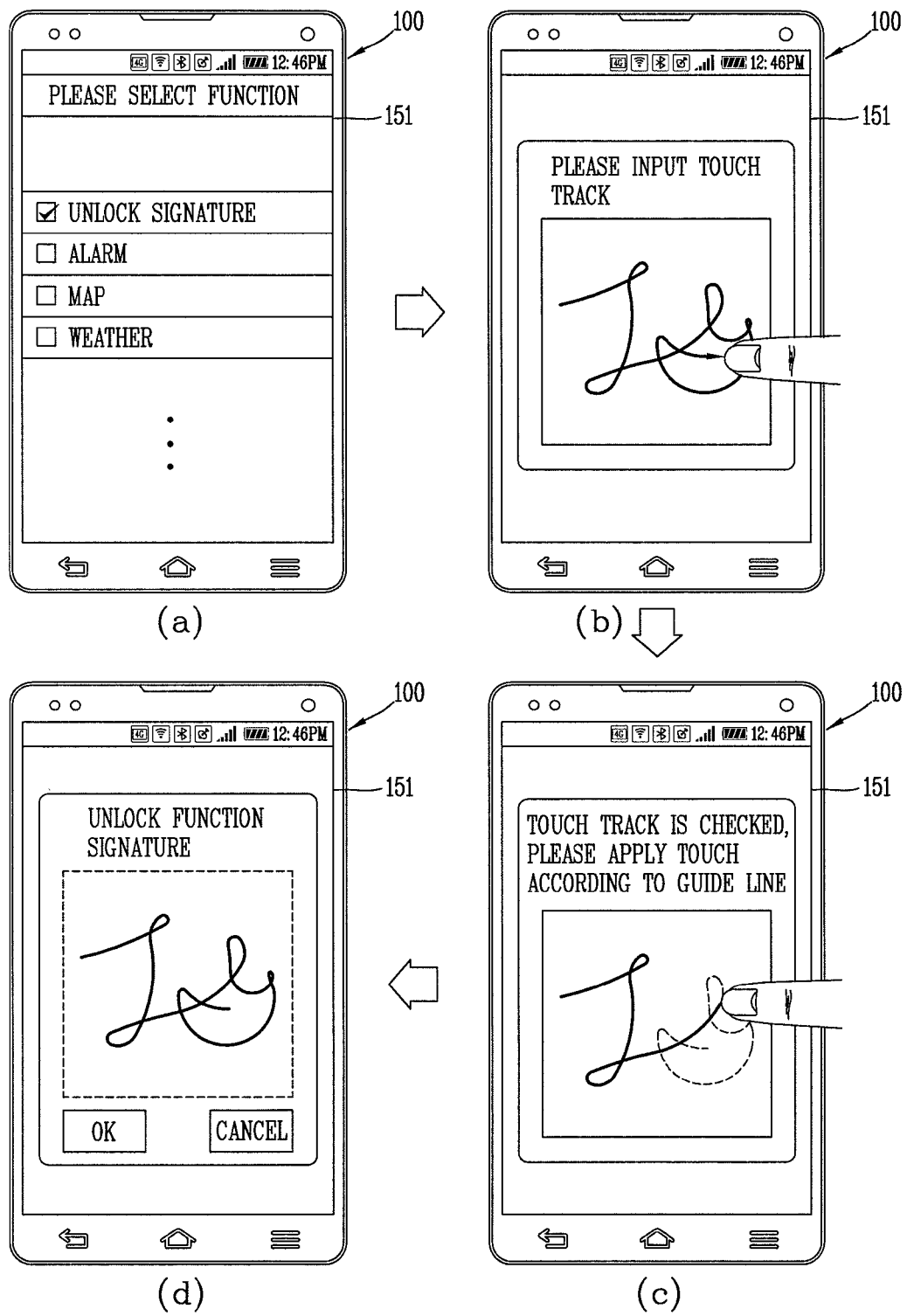
FIGS. 11A and 11B are conceptual views illustrating a method for setting touch tracks and functions associated to touch tracks in a mobile terminal according to an embodiment of the present invention.

As illustrated in FIG. 11A, the user can directly set a function corresponding to a particular touch track. For example, as illustrated in (*a*) of FIG. 11A, when a touch track corresponding to a signature function is intended to be matched, and when the signature function is selected by the user, the controller 180 can output guide information for receiving a touch track to be matched to the signature function as illustrated in (*b*) of FIG. 11. Then, as illustrated in (*c*) and (*d*) of FIG. 11A, when the same touch track is recognized, the controller 180 can match it to the signature function.

Also, in addition to the method of recognizing a particular gesture based on a touch track directly applied by the user, any one of previously stored gesture items may be selected by the user. Thus, in the mobile terminal according to the embodiment of the present invention, the user can select or input a touch track corresponding to a particular function, whereby a customized setting environment may be established.

Figure 11B:
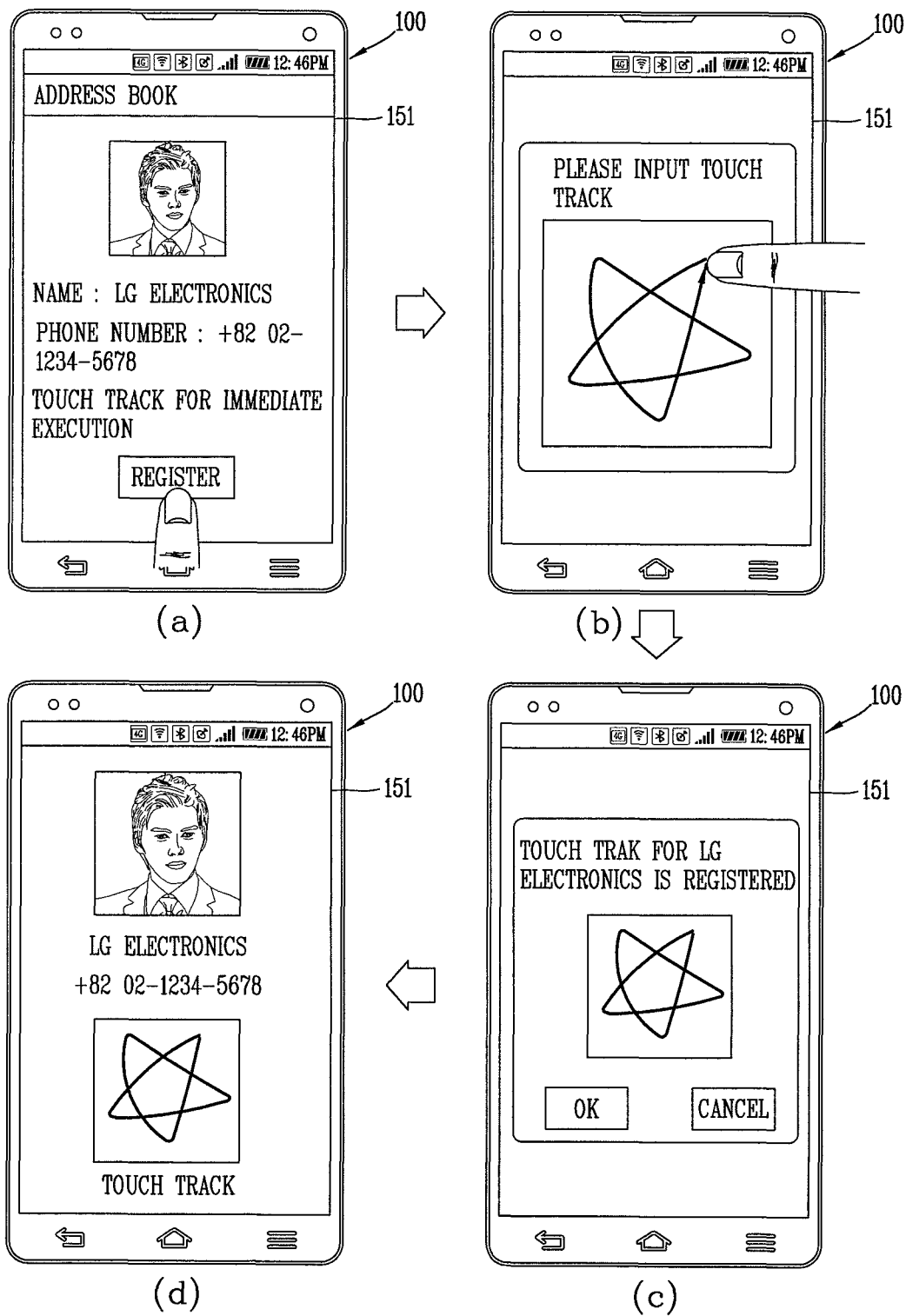

A customized setting environment may also be provided with respect to at least one of a reference period of time within which a tap is to be applied and characteristics of a tap, as well as a touch track. Further, as illustrated in FIG. 11B, the user can set a function associated with a touch track, as a function of originating a call with respect to a particular person. For example, as illustrated in (a) of FIG. 11B, when a function of originating a call with respect to a particular contact number is intended to be matched to a touch track, and when an additional function is selected by the user, the controller 180 can output guide information for receiving a touch track and receive and set a touch track as illustrated in (b) and (c) of FIG. 11B. Also, as illustrated in (d) of FIG. 11B, when a contact number is displayed, the controller 180 can display information regarding a touch track matched thereto together.

In addition, in the mobile terminal according to the embodiment of the present invention, a function associated with a touch track may correspond to a function of selecting a partial region of the entire region of the display unit 151 and activating the same. Hereinafter, a method for activating only a partial region based on a touch track will be described with reference to FIGS. 12A, 12B, 13A, 13B, 14A, 14B, 15A, and 15B.

In the mobile terminal according to the embodiment of the present invention, when the display unit 151 is deactivated, the entire region of the display unit 151 may be divided into a first region and a second region based on a touch track applied to the display unit 151. That is, the function associated with a touch track may correspond to a function of dividing the entire region of the display unit 151 into a plurality of regions.

Also, the controller 180 can sense a tap applied to the terminal body or an object within a reference period of time from a point in time at which the touch is released. In this instance, based on at least one of a touch track and a sensed tap, the controller 180 can select any one of the plurality of regions and activate the selected region. That is, in response to the tap, the controller 180 can activate the selected region and maintain a region which has not been selected, in a deactivated state.

In this instance, the controller 180 can display screen information which is varied according to at least one of a position of the selected region, a size of the selected region, and characteristics of the tap, in the selected region (hereinafter, referred to as a 'quick window'). The size and position of the quick window may be variously changed by a touch track. Further, the controller 180 can select a region in which screen information is to be displayed by using the edges of the display unit 151, the touch track, and a first touched point of the touch track and a touch released point.

Figure 12A:
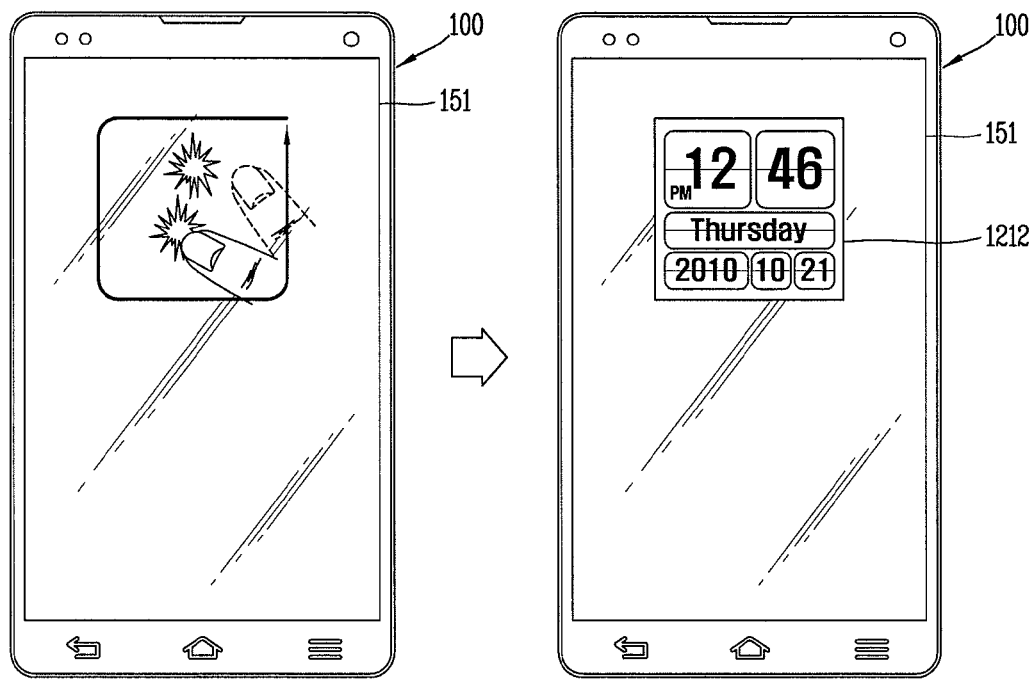
FIGS. 12A, 12B, 13A, 13B, 14A, 14B, 15A, and 15B are conceptual views illustrating a method for activating only a partial region based on touch tracks in a mobile terminal according to an embodiment of the present invention.

For example, as illustrated in FIGS. 12A(a) and (b), when a diagram having a quadrangular shape is formed by a touch track, a region 1212 surrounded by the touch track is selected. Also, when a diagram is formed by a touch track, the controller 180 can output screen information only when "knockknock" is applied to the interior of the diagram. That is, when "knockknock" is applied to a region outside of the diagram, the controller 180 does not execute a function associated with the touch track.

Figure 12B:
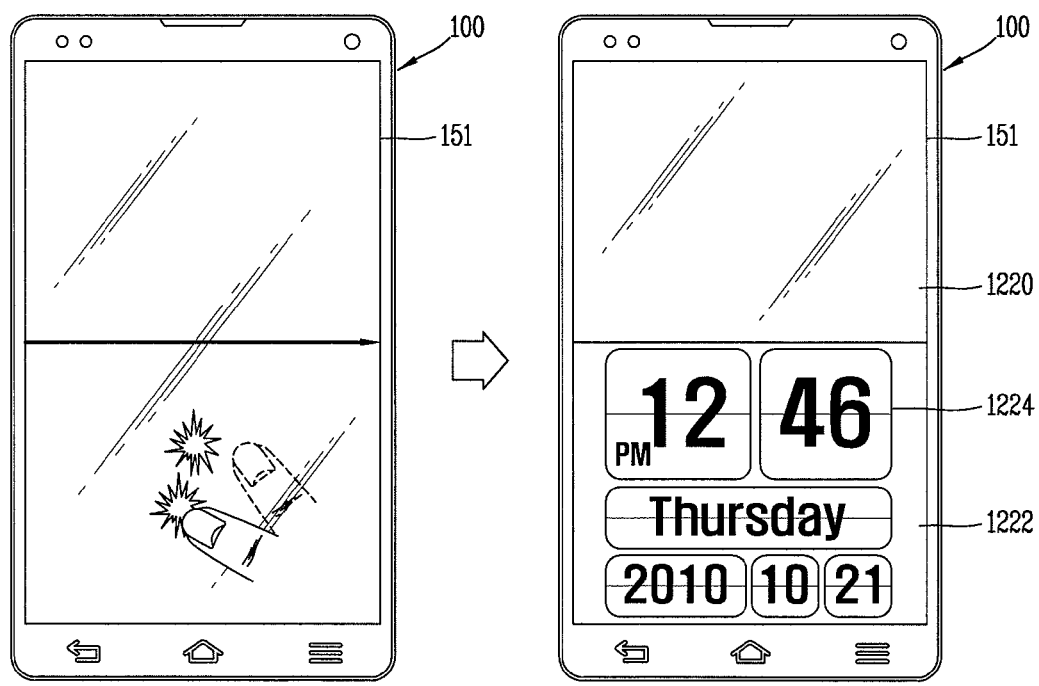

In another example, as illustrated in FIGS. 12B(a) and (b), when a first touched point is in one side of the display unit 151 and a touch released point is in the other side of the display unit 151, the entire region of the display unit 151 is divided into a plurality of regions 1220 and 1222 by a touch track. In this instance, based on a tap, the controller 180 can select the region 1222 positioned in a spot to which the tap has been applied.

Figure 13A:
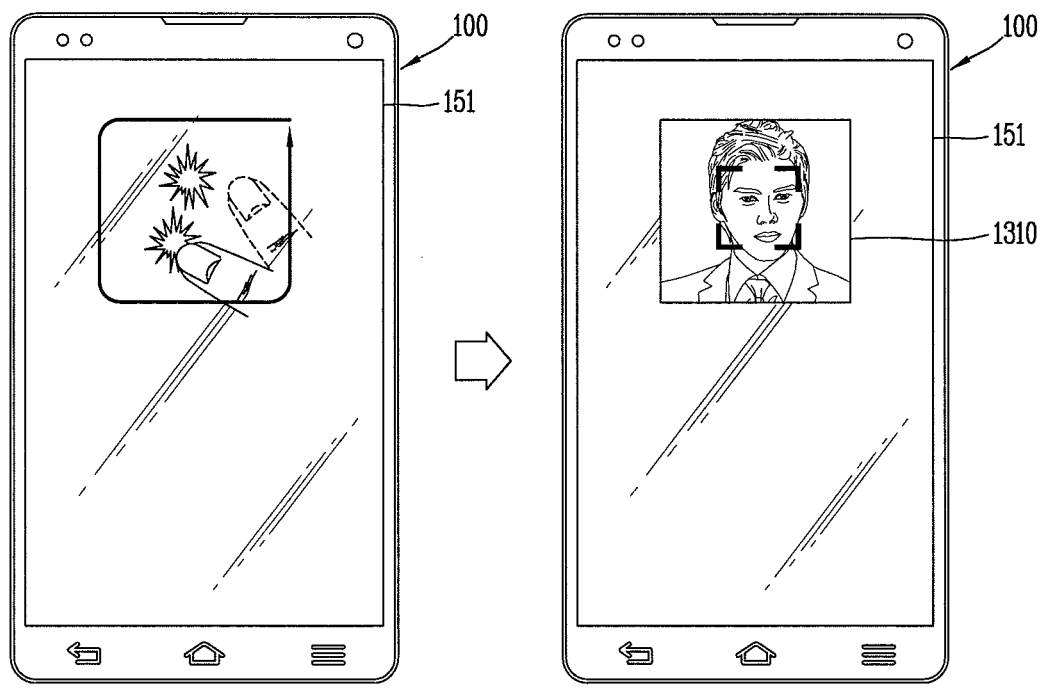

Also, when a partial region of the display unit 151 is activated, various screen information 1224 may be output, and in this instance, different information may be output according to a position where the quick window is formed. For example, as illustrated in FIGS. 13A(a) and (b), when a quick window is formed in an upper portion of the display unit 151, the controller 180 can display an image captured by a front camera in the quick window in response to a tap applied to the quick window 1310. Since the image captured by the front camera is displayed in the quick window, the mobile terminal 100 can be used as a mirror. Also, when the image captured by the front camera is displayed in the quick window, the controller 180 can search for a region including a face from the image and deform and display the searched partial region according to a rate of the quick window. Since the partial region including a face is displayed to be magnified or reduced according to a size of the quick window, the user convenience is increased.

Figure 13B:
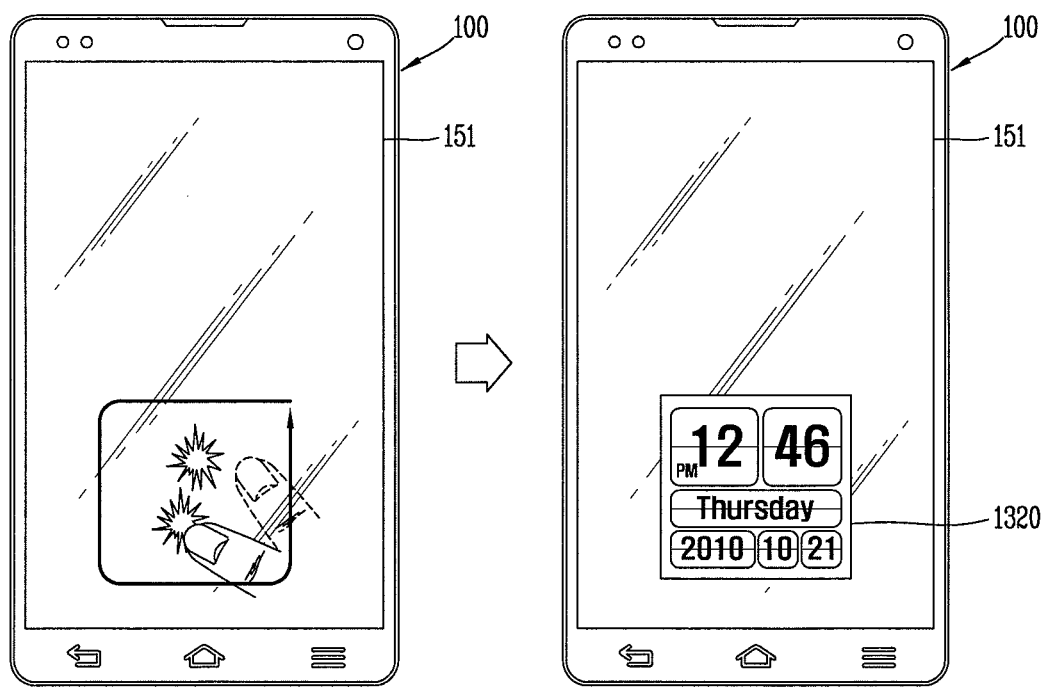

Also, in another example, as illustrated in FIGS. 13B(a) and (b), when a quick window is formed in a lower portion of the display unit 151, the controller 180 can display time information in the quick window in response to a tap applied to the quick window 1320. As the time information, various types of time information such as current time information, world time information, and the like, can be output. Also, when such an executed screen is displayed in a partial region of the display unit 151, and when a tap applied to the partial region is sensed, the controller 180 can display the executed screen in the entire region of the display unit 151.

Figure 14A:
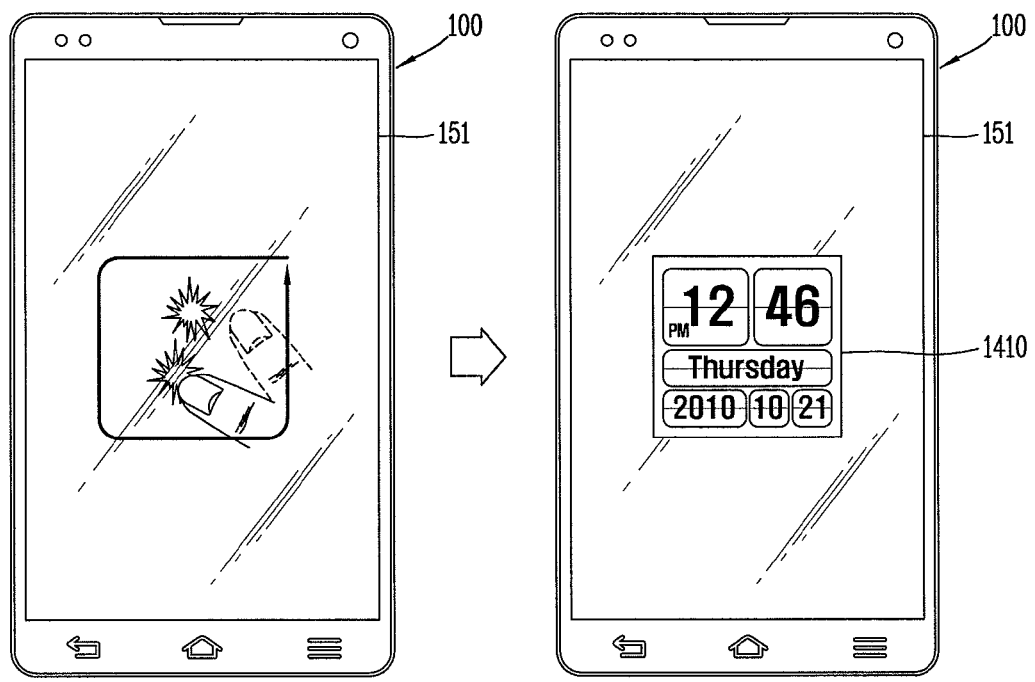
Figure 14B:
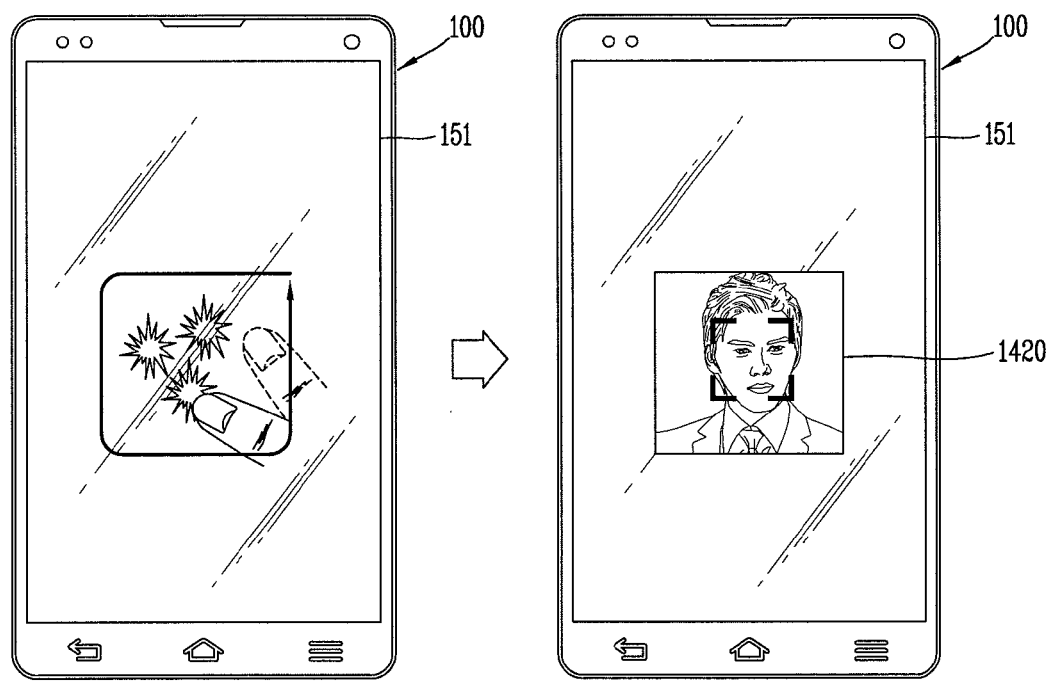

Further, the controller 180 can output different information to the partial region according to the number of applied taps. For example, as illustrated in FIGS. 14A(a) and (b), when taps successively applied twice is sensed, the controller 180 can display the time information 1410 as described above with reference to FIG. 13B, and when taps successively applied three times is sensed as illustrated in FIGS. 14B(a) and (b), the controller 180 can display an image 1420 captured by the front camera.

Further, the controller 180 can divide the entire region of the display unit into first and second regions, and display a first executed screen in any one of the first and second regions in response to a first tap. That is, a first executed screen may be displayed in any one of the regions, and the other region may be maintained in a deactivated state. In this instance, when a second tap different from the first tap is applied to the other region, the controller 180 can display a second executed screen corresponding to the second tap in the other region. That is, the first executed screen is displayed in the any one region, and the second executed screen is display in the other region. Accordingly, different executed screens may be displayed on the display unit 151.

Figure 15A:
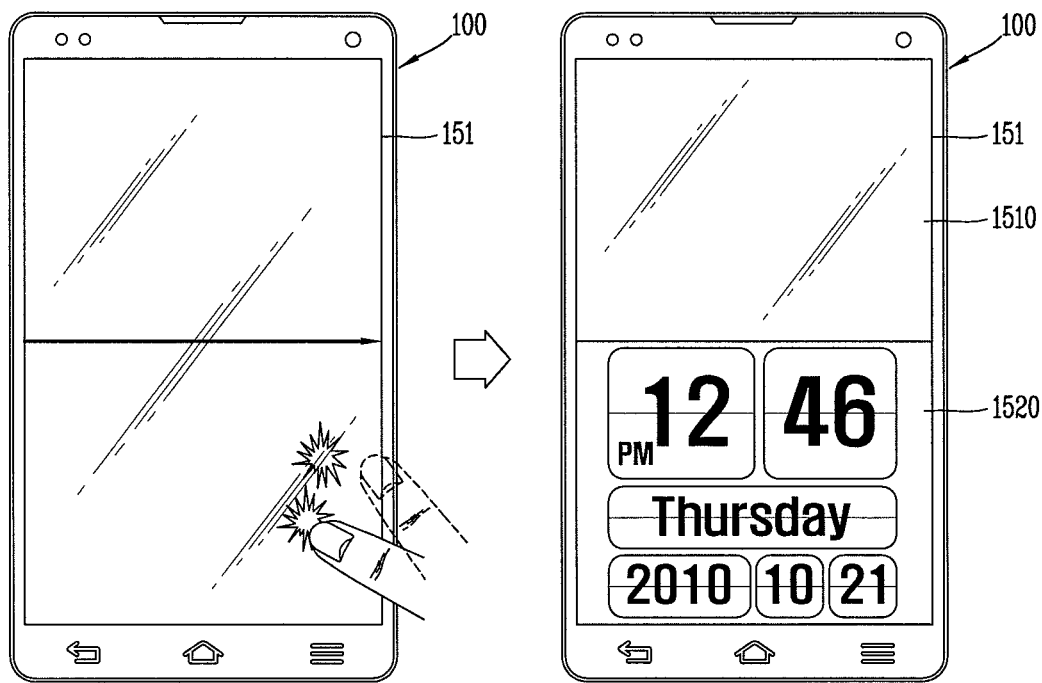
Figure 15B:
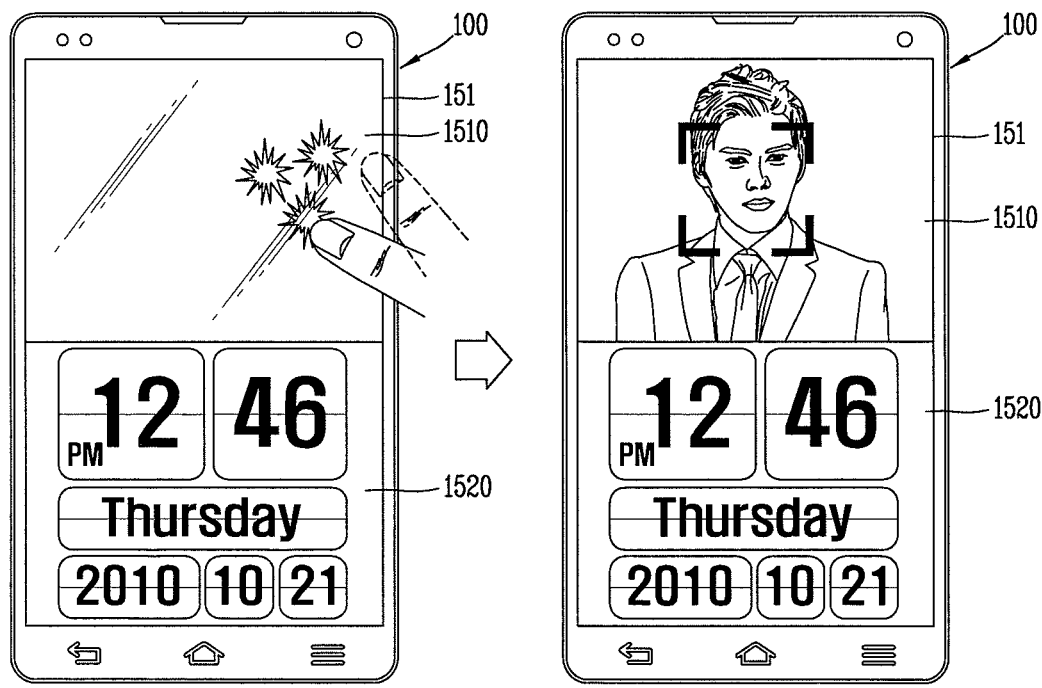

For example, as illustrated in FIGS. 15A(a) and (b), based on a touch continuously moving from a left end from the display unit 151 to a right end thereof, the display unit 151 can be divided into an upper region 1510 and a lower region 1520. Thereafter, based on a position of a tap and the number of taps applied within the reference period of time, time information may be displayed in the lower region 1520. Further, as illustrated in FIGS. 15B(a) and (b), when the time information is displayed in the lower region 1520 and the upper region 1510 is deactivated, the controller 180 can display an image captured by the front camera in the upper region 1510 based on a number of taps applied to the upper region 1510.

Further, when a particular function is being executed in the mobile terminal when lighting of the display unit 151 is turned off, the controller 180 can control the particular function in response to a touch track and a tap sensed when lighting of the display unit 151 is turned off (in a deactivated state).

For example, as illustrated in FIGS. 16A, 16B, 16C and 16D, when a music play function is executed when lighting of the display unit 151 is turned off, the controller 180 can select a control function related to the music play based on a touch track applied to the display unit 151, and execute the selected control function in response to a tap. For example, the controller 180 can adjust a sound (or a volume) of played music according to a shape of a touch track applied to the terminal body or an object or may switch played music to different music.

Figure 16A:
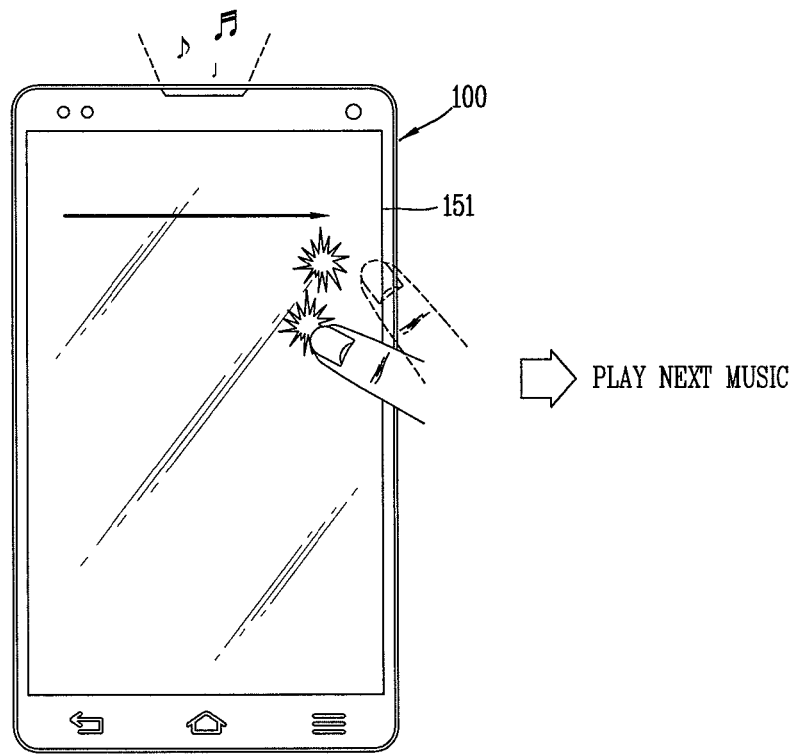
FIGS. 16A, 16B, 16C and 16D are conceptual views illustrating a method for controlling a particular function being executed in a mobile terminal according to an embodiment of the present invention.
Figure 16B:
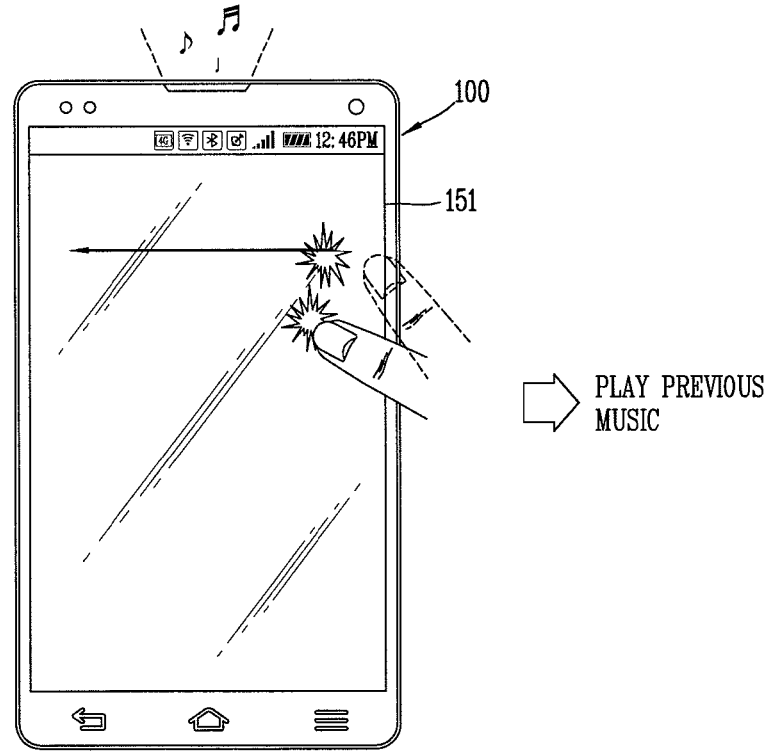

For example, as illustrated in FIG. 16A, when a touch first applied to a position of the display unit 151 is moved in a rightward direction and released and a tap is applied to a certain region of the display unit 151 within the reference period of time, the controller 180 can switch currently played music to music to be played next. As illustrated in FIG. 16B, when a touch applied to a position is moved in a leftward direction and released and a tap is applied within the reference period of time, the controller 180 can switch currently played music to previously played music.

Figure 16C:
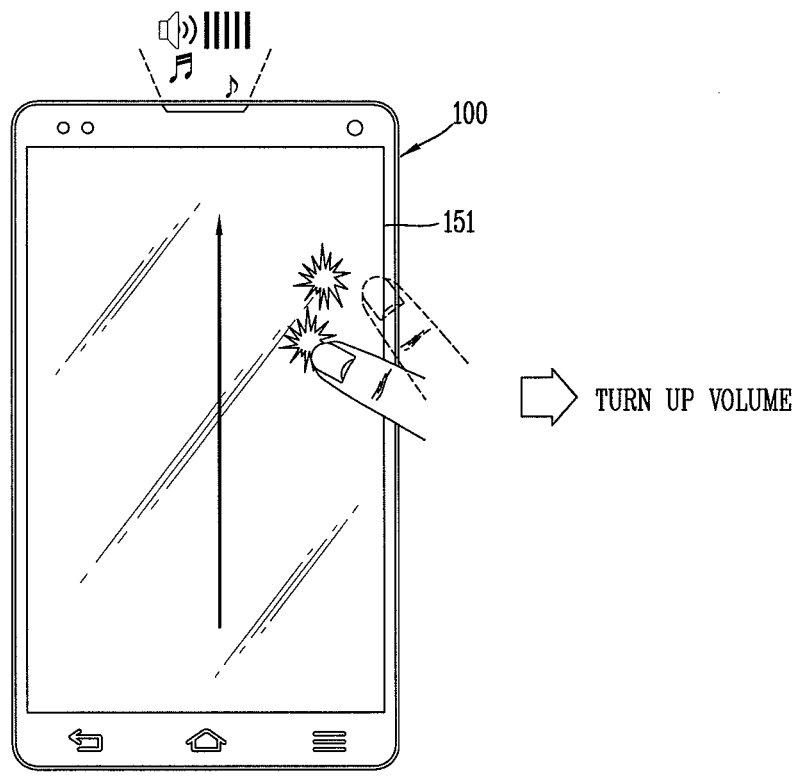
Figure 16D:
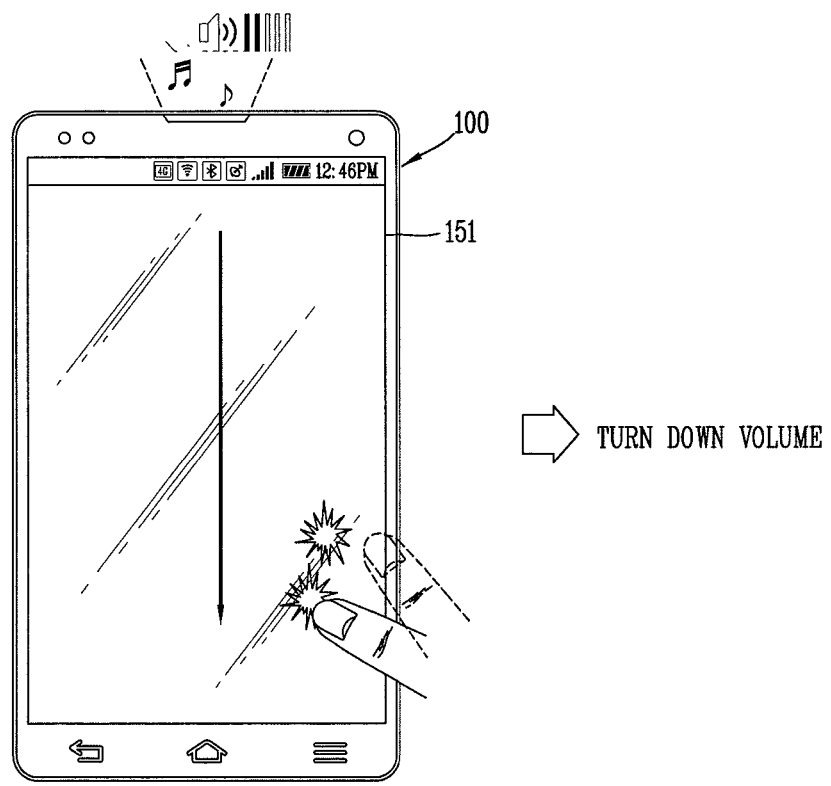

In addition, as illustrated in FIG. 16C, when a touch applied to a position is continuously moved in an upward direction and released and a tap is applied within the reference period of time, the controller 180 can turn up a volume (or a sound volume). Also, as illustrated in FIG. 16D, when a touch applied to a position is continuously moved in a downward direction and a tap is applied within the reference period of time, the controller 180 can turn down the volume.

Further, the controller 180 can differentiate a degree of control according to a movement distance of a touch track. For example, when a touch track for adjusting a sound volume is sensed, the controller 180 can control differently a degree of adjusting the sound volume according to a movement distance or size of a touch track. In a specific example, when a touch track is moved upwardly by a first reference distance, the controller 180 can turn up the volume to a magnitude corresponding to the first reference distance, and when a touch track is moved upwardly by a second reference distance, the controller 180 can turn up the volume to a magnitude corresponding to the second reference distance. Accordingly, the controller 180 can provide a more familiar user experience (UX) to the user.

As described above, the user of the mobile terminal according to the embodiment of the present invention can control the mobile terminal by simply touching and tapping the mobile terminal, when the display unit 151 is deactivated. That is, the mobile terminal according to the embodiment of the present invention provides an intuitional and simpler user interface environment to the user.

Hereinafter, an example in which one or at least one control function is executed by a tap applied to an object when the display unit 151 is activated will be described in detail with reference to the accompanying drawings. In particular, FIGS. 17A, 17B, 18, and 19 are conceptual views illustrating a method for executing a function associated with a tap in response to a tap in a mobile terminal according to an embodiment of the present invention.

In the mobile terminal according to the embodiment of the present invention, when a tap is applied to the body of the mobile terminal or an object when the display unit 151 is activated, screen information output to the display unit or an application corresponding to the screen information may be controlled. For example, the controller 180 can change a setting of an application corresponding to the screen information or change a size and/or position of a region output through the application. In addition, the controller 180 can perform different controlling according to a number of applied taps.

Figure 17A:
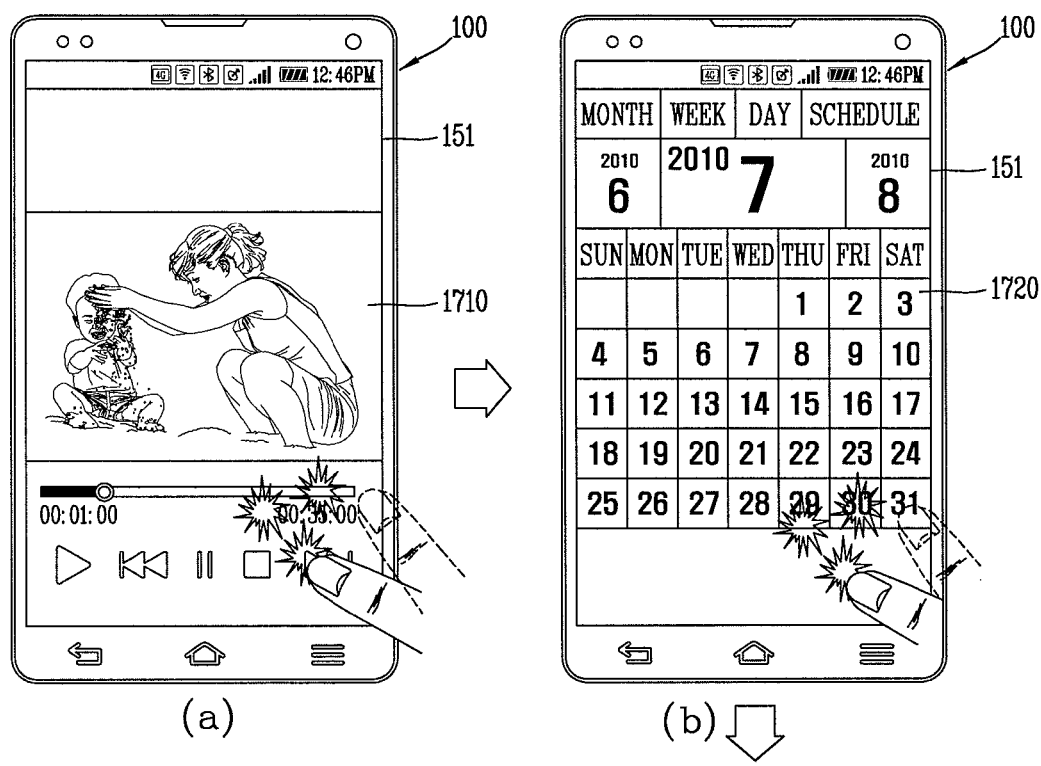
FIGS. 17A, 17B, 17C, 18, and 19 are conceptual views illustrating a method for executing a function associated with a tap in response to a tap in a mobile terminal according to an embodiment of the present invention.
Figure 17A:
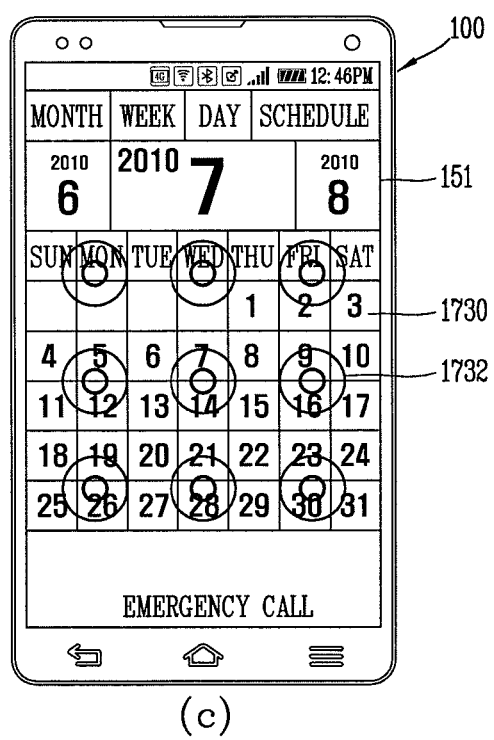
Figure 17B:
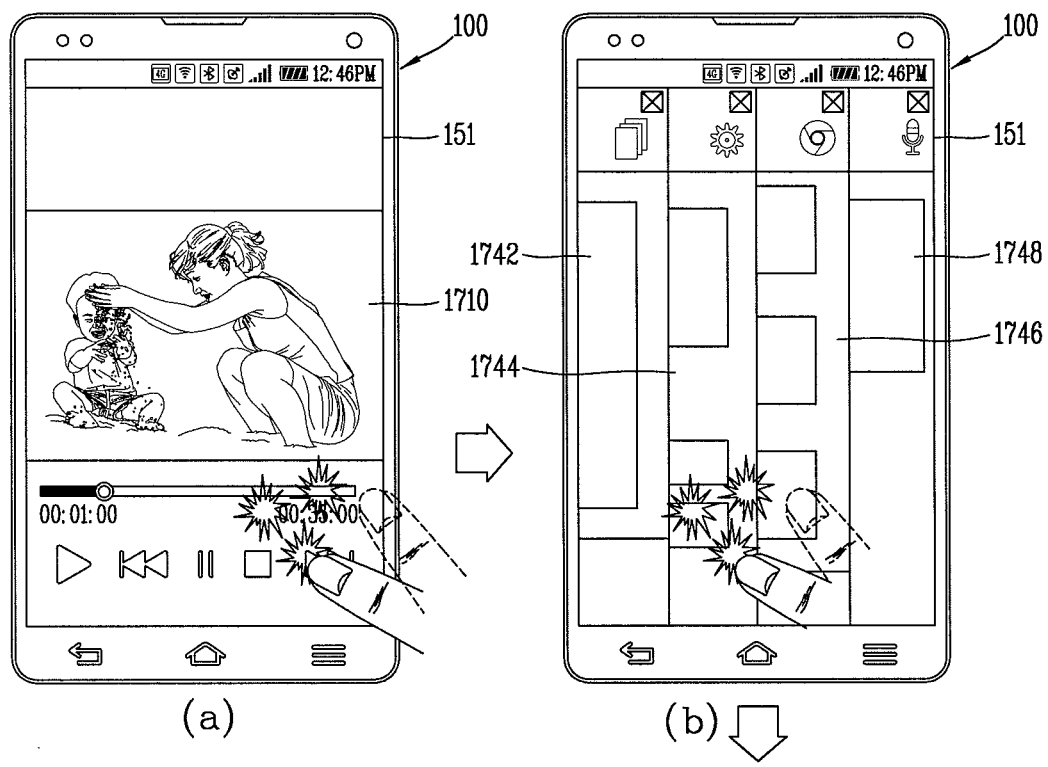
Figure 17B:
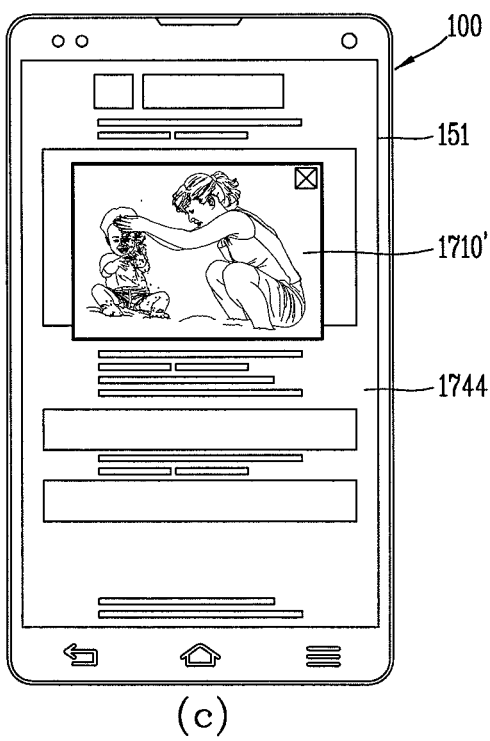
Figure 17C:
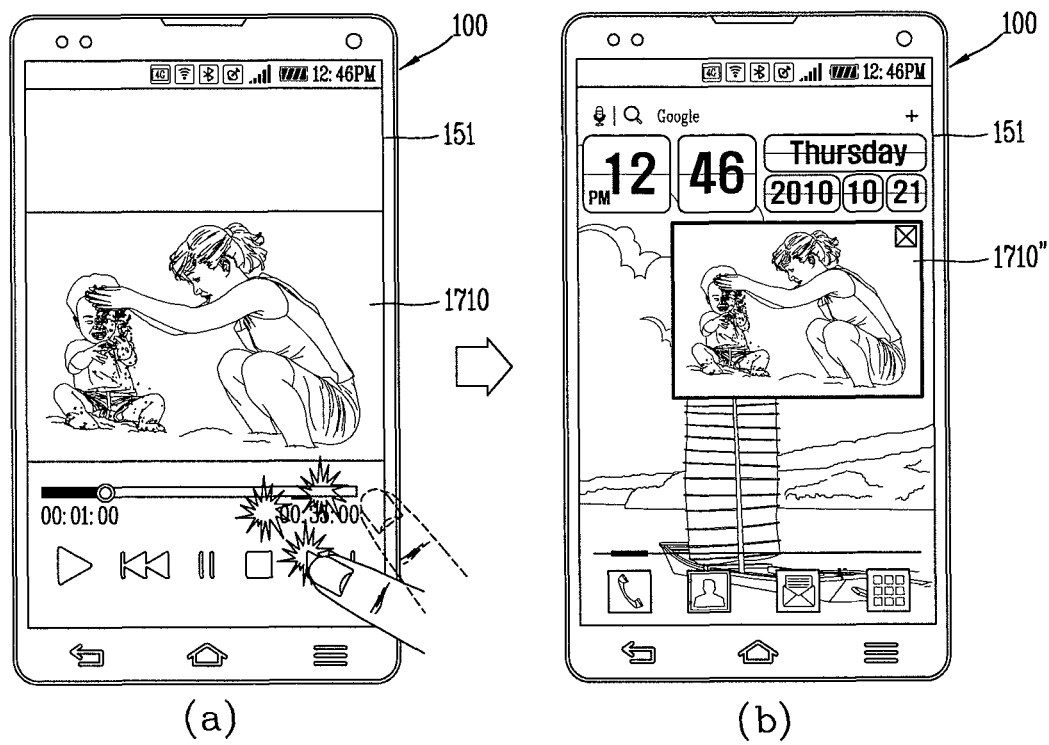
Figure 18:
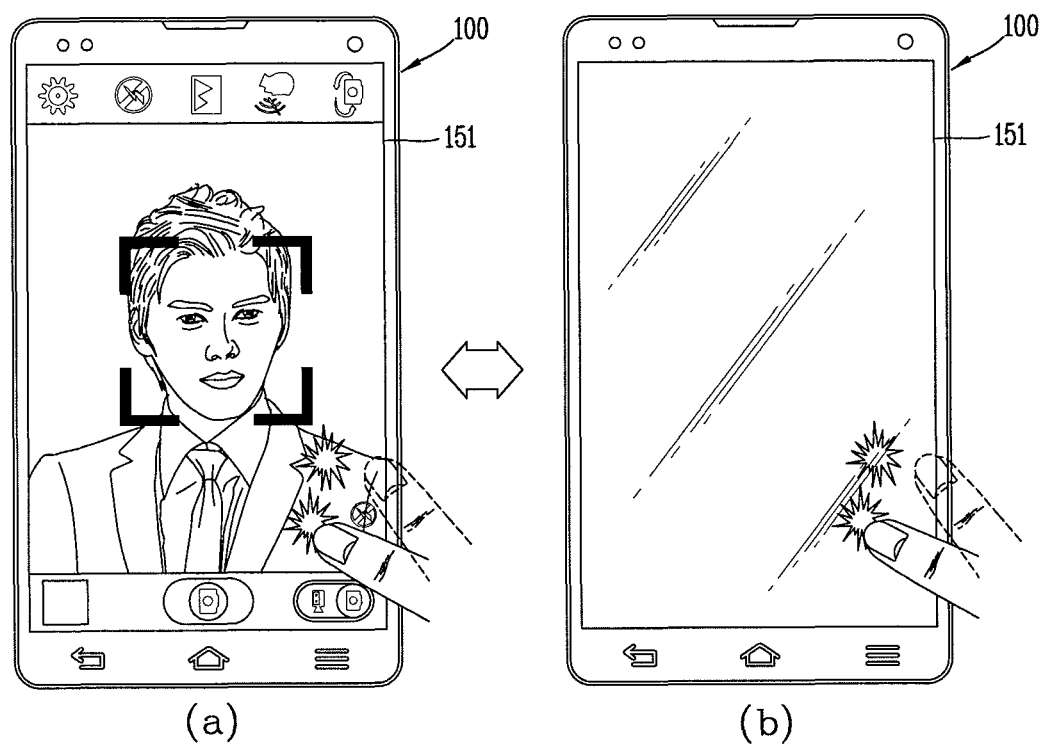
Figure 19:
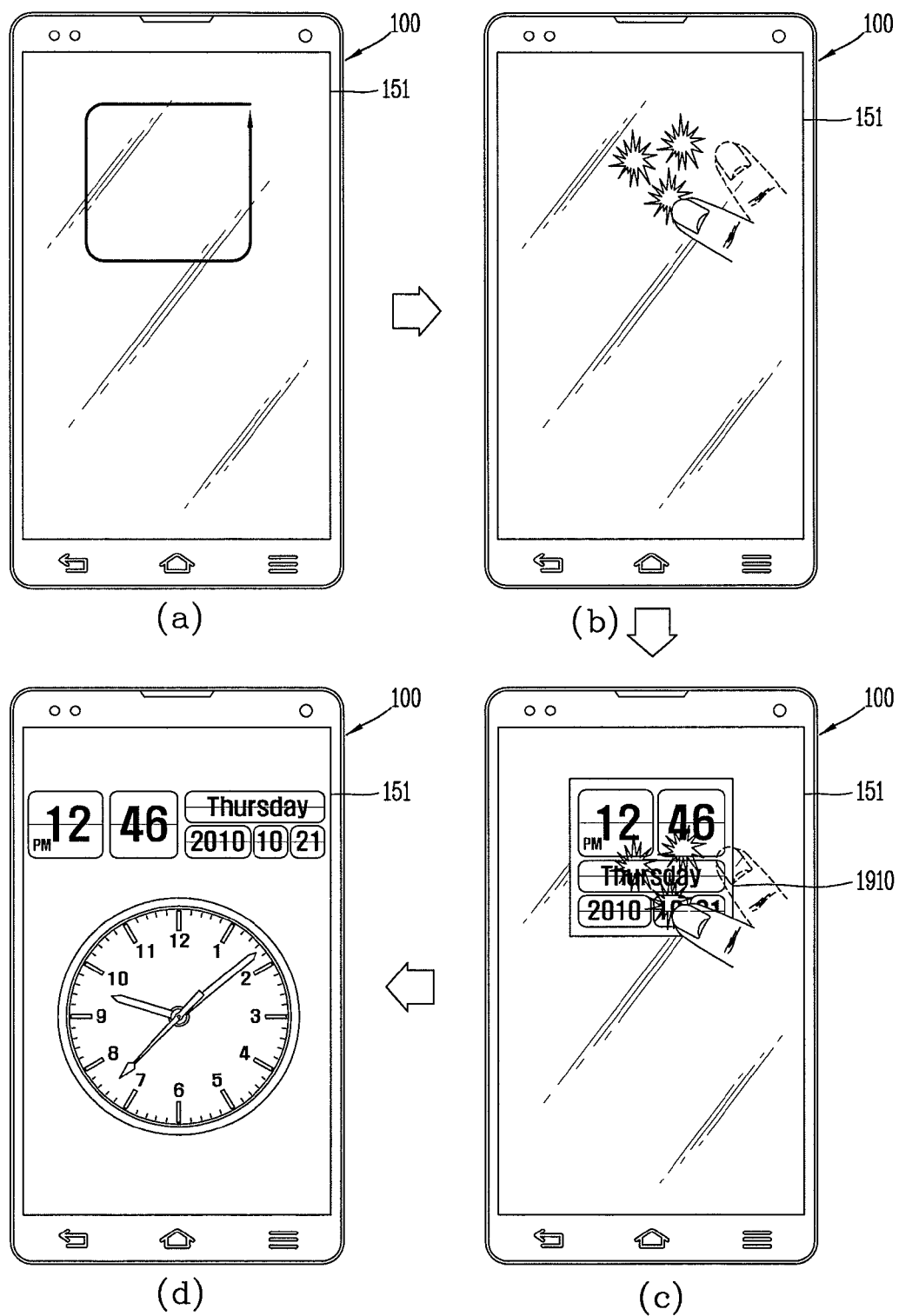

As illustrated in (*a*) of FIG. 17A, (*a*) of FIG. 17B, and (*a*) of FIG. 17C, when a video play application is driven and first screen information 1710 corresponding thereto is output, a tap may be applied to the display unit 151. In this instance, the controller 180 can calculate a number of applied taps, and execute a pre-set function according to the number of applied taps.

For example, as illustrated in (*b*) of FIG. 17A, when the display unit 151 is activated, the controller 180 can execute a schedule management application in response to taps applied three times and display second screen information 1720 corresponding thereto. In addition, as illustrated in (*c*) of FIG. 17A, when the schedule management application is executed, when taps are applied three more times, the controller 180 can execute a locked state and display a locked screen 1730 on the display unit 151.

In this instance, the locked screen 1730 may include second screen information 1720 corresponding to the schedule management application together with a graphic object 1732 formed to receive a password to release the locked state. That is, the second screen information 1720 may be output as a background screen of the locked screen 1730, and the controller 180 can control the display unit 151 to display the background screen and the graphic object in an overlapping manner. Accordingly, the user can execute a particular function by differentiating a number of taps and set the background to be displayed as the locked screen.

Also, in another example in which screen information output to the display unit 151 is controlled based on a tap, as illustrated in (*b*) of FIG. 17B, the controller 180 can display an executed screen of applications which have been executed most recently in response to three times of taps. That is, a plurality of executed screens 1742 to 1748 may be displayed in the entire region of the display unit 151.

Further, the controller 180 selects any one of the plurality of executed screens 1742 to 1748 based on a touch applied thereto, and displays the selected executed screen in the entire region of the display unit 151. Further, as illustrated in (*b*) of FIG. 17B, when a tap is applied to any one of the plurality of executed screens 1742 to 1748, as illustrated in (*c*) of FIG. 17B, the controller may display the selected executed screen 1744 together with the first screen information 1710 which had been displayed before the tap was applied. In this instance, a size of the first screen information may be scaled down in a predetermined ratio (1710'). Also, the first screen information may be moved according to a drag input by the user, and a displayed position and size may be changed.

In addition, the selected executed screen 1744 and the first screen information may be displayed in the entire region of the display unit 151. In this instance, the controller 180 can display the selected executed screen 1744 and the first screen information 1710 in an overlapping manner by adjusting transparency of the selected executed screen 1744.

Accordingly, in the mobile terminal according to the embodiment of the present invention, screen information display on the display unit 151 can be differently controlled by a tap as well as a touch when the display unit 151 is activated. In another example in which screen information output to the display unit 151 is controlled based on a tap, as illustrated in (b) of FIG. 17C, the controller 180 can adjust a size of the first executed screen 1710 into a screen 1710" in response to three taps.

In this instance, the controller 180 can differently adjust a size of the first executed screen 1710 based on strength of taps. In a specific example, when a tap having first strength is sensed, the controller 180 can adjust a size of the first execute screen 1710 into a first size, and when a tap having second strength greater than the first strength is sensed, the controller 180 can adjust the first executed screen 1710 to have a second size.

Further, when a music play application is driven and screen information corresponding thereto is output, when taps are applied to the terminal body twice, the controller 180 can play music which has been played before current music is played. Further, taps are applied to the terminal body three times, the controller 180 can play next music.

In addition, the controller 180 can adjust a sound volume based on a number of taps. In this instance, in order to inform the user about a currently controlled function, the controller 180 can display an icon corresponding to the controlled function such that it is distinguished from other icons. That is, the icon may be highlighted. For example, the icon 601 may have a visual effect such as flickering, highlighting, changing a color thereof, and the like.

In another example in which a tap is applied to the body of the mobile terminal or an object when the display unit 151 is activated, screen information output to the display unit 151 or an application corresponding to the screen information is controlled, as illustrated in FIGS. 18(a) and (b), and when taps are applied to a region of the display unit 151 twice when the camera application is driven and screen information corresponding thereto is output, the controller 180 can stop driving of the application and deactivate the display unit 151. Conversely, when taps are applied to a region of the deactivated display unit 151 twice, the controller 180 can activate the display unit 151 and display an executed screen of an application which was finally executed.

Meanwhile, referring to FIGS. 19(a)-(d), when the display unit 151 is deactivated, the controller 180 can set a partial region to be activated in the entire region of the display unit 151 based on a touch track, and display screen information 1910 changed according to characteristics of a tap based on a tap applied to the partial region. For example, when taps applied to the terminal body three times are sensed, the controller 180 can display the time information as described above with reference to FIG. 13B in the partial region 1910. In this instance, the controller 180 can provide guide information that lighting should be turned on by using the light emitting unit 156 until when a tap is applied from a point in time at which the touch is released and a tap should be applied.

Meanwhile, when the partial region is activated by a tap, another tap may be applied to the partial region. In this instance, the controller 180 can execute different functions based on characteristics of the tap applied to the partial region. For example, when three taps applied to the partial region are sensed, the controller 180 can display the time information displayed in the partial region, in the entire region. In this instance, the controller 180 can magnify the size of the information displayed as the time information or may add information which has not been displayed in the partial region. In another example, when two taps applied to the partial region are sensed, the controller 180 cannot display the time information. That is, the controller 180 can deactivate the entire region of the display unit 151 again.

As described above, in the mobile terminal according to the embodiment of the present invention, a function related to screen information output to the display unit in response to a tap applied to the display unit 151 when the display unit 151 is activated. Thus, the user may easily manipulate the function by simply tapping the body of the mobile terminal or an adjacent object.

Figure 20A:
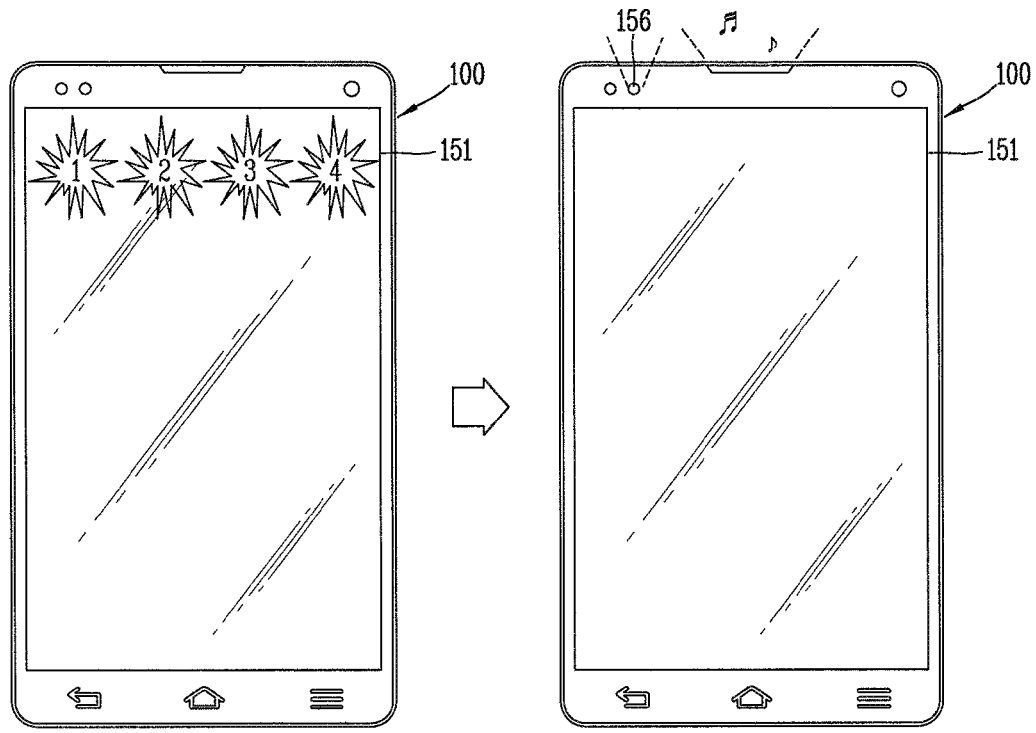
FIGS. 20A and 20B are conceptual views illustrating a method for playing music in a mobile terminal according to an embodiment of the present invention.
Figure 20B:
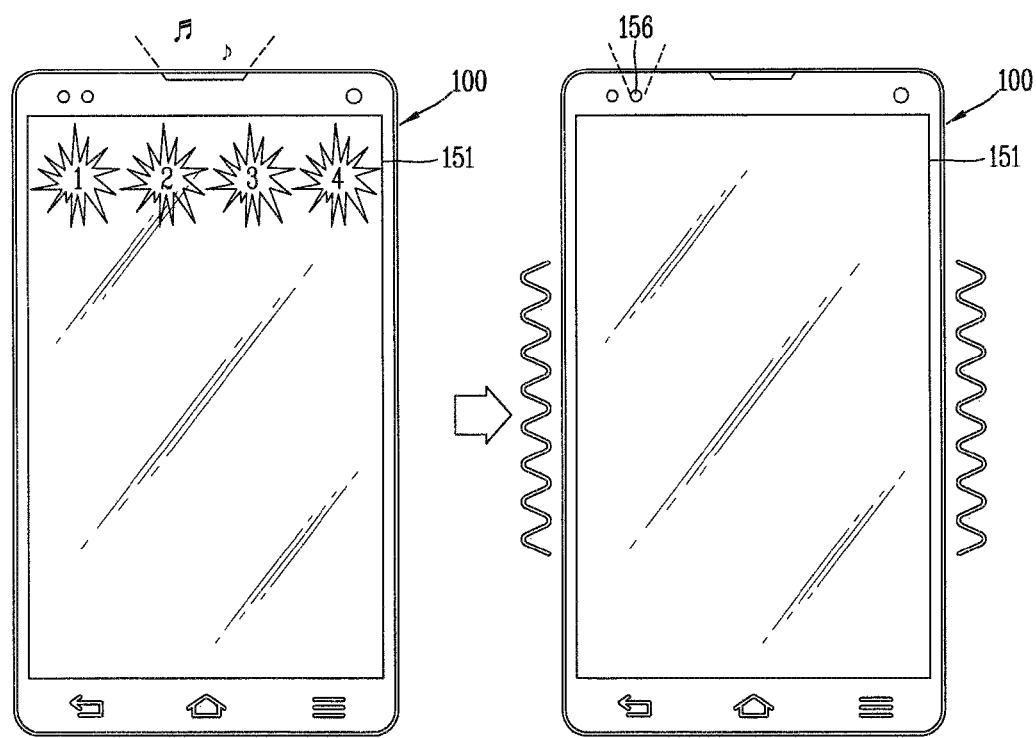

FIGS. 20A and 20B are conceptual views illustrating a method for playing music in a mobile terminal according to an embodiment of the present invention. Referring to FIGS. 20A(a) and (b), when the display unit 151 is deactivated, a plurality of taps may be sequentially applied (1→2→3→4). For example, when the terminal body is put in a pocket, a gesture of tapping the pocket a plurality of times may be generated. In more detail, the user may put his four fingers on the display unit 151 and sequentially apply taps to the display unit 151 by using four fingers. In this instance, the sensing unit 140 may sense the taps by using a movement of the terminal body, so the sensing unit 140 may sense the taps applied to an object when a front side of the display unit 151 is covered by the object.

Further, when a pre-set number of taps are sequentially applied, the controller 180 can output a sound by using the audio output module 153, while maintaining the display unit 151 in a deactivated state. That is, the controller 180 can play music by executing a music play application or may output a broadcast by executing a radio application. In particular, when an earphone is connected to a jack, the controller 180 can play music by using a music play application. In this instance, when a plurality of taps are applied, the light emitting unit 156 may turn on lighting one time, thus providing guide information that the taps have been properly applied.

Conversely, referring to FIGS. 20B(a) and (b), when a plurality of taps are sequentially applied (1→2→3→4), while a sound is being output, the controller 180 can deactivate the audio output module 153. That is, the controller 180 stops playing of music or stops outputting of a broadcast. In this instance, the controller 180 can provide guide information that the sound output function is stopped by using the light emitting unit 156 or the haptic module 155. Accordingly, the user can execute the music play application in a simpler manner of tapping the terminal body to listen to music or stop playing of music he or she has listened to.

According to embodiments of the present invention, the mobile terminal executes different functions according to a touch track applied when the display unit is deactivated. At this time, since a function associated with a touch track is executed only when a pre-set tap is applied, a generation of malfunction caused due to a touch not intended by a user may be prevented. Since different functions may be executed by using a touch and a tap when the display unit is deactivated, novel user convenience may be provided.

Also, in the mobile terminal according to embodiments of the present invention, a touch unit configured to sense a touch is periodically activated or deactivated when the display unit is deactivated. In this instance, when a touch applied to the deactivated display unit is moved from a first touched position, rather than being released, the sensing unit is completely activated to trace a touch track, a touch track may be accurately calculated and power efficiency may be increased by the sensing unit.

In the embodiments of the present invention, the foregoing method may be implemented as codes that can be read by a processor in a program-recorded medium. The processor-readable medium may include a ROM, a RAM, a CD-ROM, a magnetic tape, a floppy disk, an optical data storage device, and the like. The processor-readable medium also includes implementations in the form of carrier waves (e.g., transmission via the Internet).

In the embodiments of the present invention, the foregoing method may be implemented as codes that can be read by a processor in a program-recorded medium. The processor-readable medium may include a ROM, a RAM, a CD-ROM, a magnetic tape, a floppy disk, an optical data storage device, and the like. The processor-readable medium also includes implementations in the form of carrier waves or signals (e.g., transmission via the Internet).

The present invention encompasses various modifications to each of the examples and embodiments discussed herein. According to the invention, one or more features described above in one embodiment or example can be equally applied to another embodiment or example described above. The features of one or more embodiments or examples described above can be combined into each of the embodiments or examples described above. Any full or partial combination of one or more embodiment or examples of the invention is also part of the invention.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A mobile terminal comprising:
a terminal body;
a wireless communication unit configured to perform wireless communication;
a touchscreen display unit configured to switch between an inactivated state in which illumination is not applied to the touchscreen display unit and an activated state in which illumination is applied to the touchscreen display unit; and
a controller configured to:
receive a touch pattern input while the touchscreen display unit is in the inactivated state,
receive a pre-set tapping input while the touchscreen display unit is in the inactivated state, and
in response to receiving the pre-set tapping input within a first predetermined time period after the touch pattern input, switch the touchscreen display unit from the inactivated state to the activated state, execute a function corresponding to the touch pattern input and display an execution screen of the function on the touchscreen display unit,
wherein the function is varied based on a shape or a pattern of the touch pattern input,
wherein the pre-set tapping input includes at least a first tap and a second tap, the second tap being received within a second predetermined time period after the first tap,
wherein the function corresponding to the touch pattern input includes:
dividing the touchscreen display unit into a first region and a second region; and
activating the first region based on the pre-set tapping input while maintaining the second region in the inactivated state, and
wherein a location and a size of the first region are varied according to a touch track of the received touch pattern input.

2. The mobile terminal of claim 1, wherein the controller is further configured to maintain the touchscreen display unit in the inactivated state before the pre-set tap input is sensed.

3. The mobile terminal of claim 2, wherein the controller is further configured to maintain the touchscreen display unit in the inactivated state when the pre-set tapping input is sensed within the first predetermined time period and there is no function corresponding to the touch track of the received touch input.

4. The mobile terminal of claim 1, wherein the pre-set tapping input occurs on one of the mobile terminal itself or an object the mobile terminal is placed on.

5. The mobile terminal of claim 1, wherein the controller is further configured to execute different functions for different shapes formed by a touch track of the received touch pattern input.

6. The mobile terminal of claim 1, wherein the touch pattern input corresponds to a superordinate function, and
wherein the controller is further configured to execute a subordinate function of the superordinate function based on at least one of a position to which the pre-set tapping input has been applied and a number of applied tapping gestures corresponding to the pre-set tapping input.

7. The mobile terminal of claim 6, wherein the superordinate function corresponding to the touch pattern input corresponds to a call origination function, and
wherein the controller is further configured to:
execute a call origination function with respect to a first counterpart, when a first tapping gesture applied to the terminal body by a first reference number of times is input, and
execute a call origination function with respect to a second counterpart, when a second tapping gesture applied to the terminal body by a second reference number of times different from the first reference number of times is input.

8. The mobile terminal of claim 1, further comprising:
a light emitting unit disposed on a front surface of the terminal body and configured to emit light based on the function when the function is executed.

9. The mobile terminal of claim 8, wherein the controller is further configured to:
control the light emitting unit to emit a first light when the function corresponds to a first function, and
control the light emitting unit to emit a second light when the function corresponds to a second function different from the first function.

10. The mobile terminal of claim 8, wherein the controller is further configured to control the light emitting unit to emit light during the touch pattern input or until a point in time at which the pre-set tapping input is sensed.

11. The mobile terminal of claim 1, wherein the controller is further configured to display executed screens of different functions in the first region, based on at least one of a position to which the pre-set tapping input is applied and a number of applied tapping gestures corresponding to the pre-set tapping input.

12. The mobile terminal of claim 1, wherein the controller is further configured to release a locked state of the mobile terminal without inputting a password, when the shape formed by the touch pattern input matches a signature stored in advance.

13. The mobile terminal of claim 1, wherein the controller is further configured to:
activate a doze mode in the mobile terminal, after the touchscreen display unit is deactivated, and
when a first touch input of the touch pattern input is moved from a first touch position rather than being released, enter an active mode for receiving the pattern touch input.

14. The mobile terminal of claim 13, wherein when the pre-set tapping input is not received within the first predetermined time period after the touch pattern input, the controller is further configured to re-activate the doze mode.

15. The mobile terminal of claim 1, wherein the inactivated state is a state in which no information and no graphic images are displayed on the touchscreen display unit.

16. A method of controlling a mobile terminal, the method comprising:
receiving, via a controller of the mobile terminal, a touch pattern input while a touchscreen display unit is in an inactivated state in which illumination is not applied to the touch screen display unit of the mobile terminal;
receiving, via the controller, a pre-set tapping input while the touchscreen display unit is in the inactivated state; and
in response to receiving the pre-set tapping input within a first predetermined time period after the touch pattern input, switching, via the controller, the touchscreen display unit from the inactivated state to an activated state in which illumination is applied to the touchscreen display unit, executing a function corresponding to the touch pattern input and displaying an execution screen of the function on the touchscreen display unit,
wherein the function is varied based on a shape or a pattern of the touch pattern input,
wherein the pre-set tapping input includes at least a first tap and a second tap, the second tap being received within a second predetermined time period after the first tap,
wherein the switching the touchscreen display unit from the inactivated state to the activated state comprises:
dividing the touchscreen display unit into a first region and a second region; and
activating the first region based on the pre-set tapping input while maintaining the second region in the inactivated state, and
wherein a location and a size of the first region are varied according to a touch track of the received touch pattern input.

17. The method of claim 16, wherein the inactivated state is a state in which no information and no graphic images are displayed on the touchscreen display unit.

* * * * *